(12) United States Patent
Brown et al.

(10) Patent No.: US 8,891,756 B2
(45) Date of Patent: Nov. 18, 2014

(54) COLLISION-RESISTANT ELLIPTIC CURVE HASH FUNCTIONS

(75) Inventors: Daniel R. L. Brown, Mississauga (CA); Matthew J. Campagna, Ridgefield, CT (US); Marinus Struik, Toronto (CA)

(73) Assignee: Certicom Corp., Mississauga, Ontario (CA)

( * ) Notice: Subject to any disclaimer, the term of this patent is extended or adjusted under 35 U.S.C. 154(b) by 653 days.

(21) Appl. No.: 12/609,891

(22) Filed: Oct. 30, 2009

(65) Prior Publication Data

US 2010/0111296 A1 May 6, 2010

Related U.S. Application Data

(60) Provisional application No. 61/109,540, filed on Oct. 30, 2008.

(51) Int. Cl.
*H04L 9/28* (2006.01)
*H04L 9/30* (2006.01)
*H04L 9/06* (2006.01)

(52) U.S. Cl.
CPC ........... *H04L 9/3066* (2013.01); *H04L 2209/80* (2013.01); *H04L 2209/20* (2013.01); *H04L 9/0643* (2013.01)
USPC .......................................................... 380/28

(58) Field of Classification Search
USPC .......................................................... 380/28
See application file for complete search history.

(56) References Cited

U.S. PATENT DOCUMENTS

2004/0107341 A1  6/2004  Hall et al.
2007/0122004 A1  5/2007  Brown et al.

FOREIGN PATENT DOCUMENTS

JP  1137734 A  5/1989
JP  6043890 A  2/1994

OTHER PUBLICATIONS

Saarinen, Cryptanalysis of Block Ciphers Based on SHA-1 and MD5, 2003, Retrieved from the Internet <URL: .springerlink.com/content/xu0qg98tg38gl7nf/>, pp. 1-9 as printed.*
Ahmadi et al., Parallel Formulations of Scalar Multiplication on Koblitz Curves, Jan. 2008, Retrieved from the Internet <URL: .jucs.org/jucs_14_3/parallel_formulations_of_scalar/jucs_14_3_0481_0504_ahmadi.pdf>, pp. 1-24 as printed.*
Johnson et al., The Elliptic Curve Digital Signature Algorithm (ECDSA), 2001, Retrieved from the internet <URL: .springerlink.com/content/0l7a1w9w38xl6w6r/>, pp. 1-28 as printed.*
Bellare, Mihir; Micciancio, Daniele; "A New Paradigm for Collision-free Hashing: Incrementality at Reduced Cost"; Nov. 1996; Retrieved from http://cseweb.ucsd.edu/~daniele/papers/IncHash.pdf.
Oprea, Karen; International Search Report from corresponding PCT Application No. PCT/CA2009/001559; search completed Mar. 1, 2010.

(Continued)

*Primary Examiner* — Michael Chao
(74) *Attorney, Agent, or Firm* — Fish & Richardson P.C.

(57) ABSTRACT

Elliptic curve hash functions are provided which do not require a pre-existing hash function, such as that required by the MuHash. The elliptic curve hash functions can be built from scratch and are collision free and can be incremental. In one embodiment, rather than a pre-existing hash function, the identity function with padding is used; and in another embodiment, rather than a pre-existing hash function, a block cipher with a fixed non-secret key is used.

33 Claims, 6 Drawing Sheets

(56) References Cited

OTHER PUBLICATIONS

Extended European Search Report issued in EP Application No. 09822947.9 on Apr. 11, 2014.

Bellare et al.; "Incremental Cryptography: The Case of Hashing and Signing"; Advances in Cryptology, Proceedings of the Annual International Cryptology Conference, Aug. 21, 1994.

Brown, "The Encrypted Elliptic Curve Hash", International Association for Cryptologic Research, vol. 20080429:183902, Apr. 29, 2008.

Office Action issued in Canadian Application No. 2,642,399 on Nov. 18, 2010; 4 pages.

Office Action issued in Canadian Application No. 2,642,399 on Jul. 5, 2012; 3 pages.

Office Action issued in Canadian Application No. 2,642,399 on Jan. 14, 2014; 3 pages.

\* cited by examiner

COLLISION-RESISTANT ELLIPTIC CURVE HASH FUNCTIONS

This application claims priority from U.S. Provisional Patent Application No. 61/109,540 filed on Oct. 30, 2008, the contents of which are incorporated herein by reference.

TECHNICAL FIELD

The following relates generally to hash functions and in particular to elliptic curve hash functions.

BACKGROUND

The hash function is a well known mathematical function that is widely used in the field of cryptography for transforming input 'messages' into fixed length output message digests. Ideal hash functions are assumed to be intractable and collision free, namely the original text cannot be obtained from the message digest or hash value and any two different messages will produce different hash values. In other words, a collision-free hash function maps arbitrarily long inputs to outputs of a fixed length, but in such a way that it is computationally infeasible to find a collision (two distinct messages x, y which map to the same output). Various collision-free and collision resistant functions have been proposed, e.g. for hashing messages before digitally signing them with the expectation of only needing to sign the relatively shorter hash value.

One such collision-free hashing paradigm provides the Multiplicative Hash (MuHash) and Additive Hash (AdHash) designed by Bellare and Micciancio (Bellare, M. and Micciancio, D; "A New Paradigm for Collision-free Hashing: Incrementality at Reduced Cost; November 1996). The collision-free hash functions designed by Bellare and Micciancio intend to also enable incrementality, meaning if a message x which has been previously hashed is modified to produce x', then rather than having to re-compute the hash of x' from scratch, an "update" of the old hash can quickly be obtained. In this way, if blocks of the messages can be replaced, the new hash can be computed using knowledge of only the old and new blocks, and the old hash thus enabling the new hash to be computed much faster than the old hash.

The MuHash comprises dividing a message into blocks. Each block is concatenated with a unique index value. The block is then mapped into a multiplicative group using a pre-existing hash function. All of the group elements, each corresponding to a block of the message are then multiplied together, to yield a hash value. In order to prove the MuHash is collision resistant, Bellare and Micciancio assumed: a) the pre-existing hash to be a random oracle, namely where the hash is drawn at random from some family of functions, and then made public; and b) the discrete logarithm in the multiplicative group is intractable.

In addition to being incremental, the MuHash was shown to be parallelizable, which provides efficiencies, in particular when implementing the MuHash in hardware. As noted above, MuHash requires a pre-existing hash, in particular a fixed-input-length hash. The security proof for MuHash models this hash by a random oracle, which is considered a strong assumption. Furthermore, MuHash is only collision resistant if the pre-existing hash is collision resistant.

BRIEF DESCRIPTION OF THE DRAWINGS

Embodiments will now be described by way of example only with reference to the appended drawings wherein.

DETAILED DESCRIPTION OF THE DRAWINGS

Although MuHash provides a reasonable scheme for converting a fixed-input-length collision resistant hash function into a variable-input-length hash function, MuHash does not provide a mechanism for building a collision resistant hash function from scratch.

It has been recognized that to eliminate the reliance in MuHash on the pre-existing hash function, the group in which the discrete logarithm is difficult can be chosen as an elliptic curve group and the pre-existing hash function replaced with another function known to be collision free. As will be shown below, in one embodiment, the replacement function is the identity function with some padding and, in another embodiment, the replacement function is a secure block cipher, with a fixed non-secret key.

Exemplary Cryptographic Environment

Figure 1:
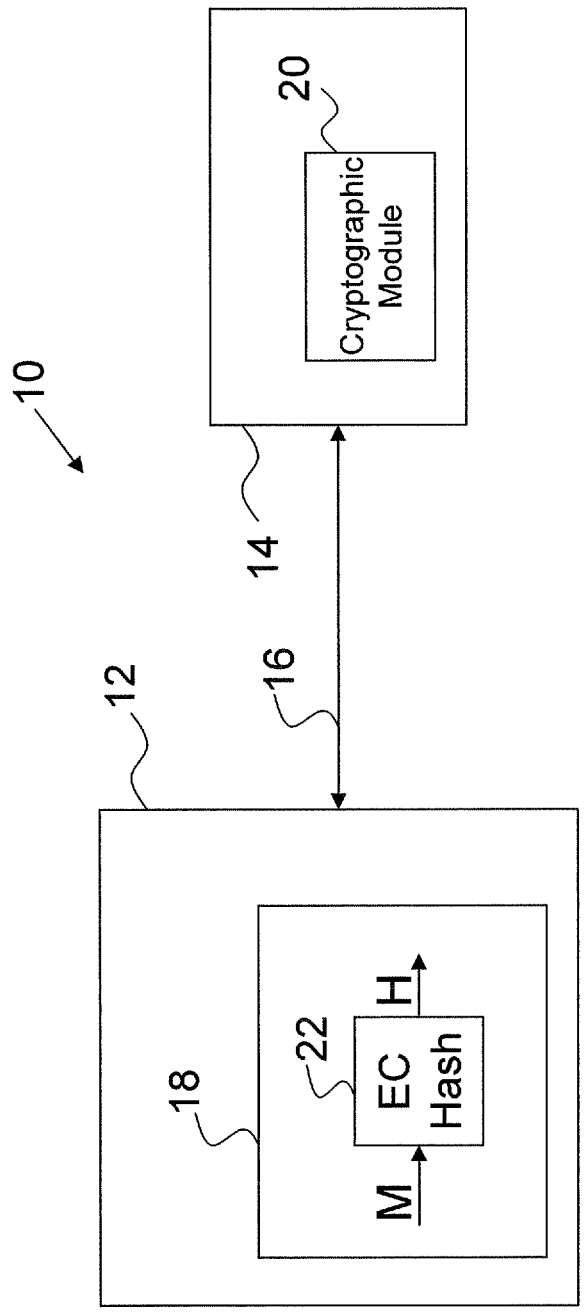
FIG. 1 is a schematic diagram of an exemplary data communication system.

Turning now to FIG. 1, an exemplary digital communication system 10 is shown. The system 10 in this example comprises a first correspondent device 12 connected to a second correspondent device 14 over a network 16. It will be appreciated that the network 16 may comprise any wired or wireless network or may even represent a connection between different modules of the same physical electronic device. It will also be appreciated that the correspondent devices 12, 14 may represent any computing device, for example a desktop or laptop computer, a chip or processor, a mobile communications device such as a smart phone, personal digital assistant (PDA), cellphone, etc. Each correspondent device 12, 14 may act as a sender or receiver and may also act is a signer when generating digital signatures or as a verifier when verifying such digital signatures. Each correspondent device 12, 14 has a respective cryptographic unit 18, 20, embodied in hardware, software, or a combination of the two. The cryptographic units 18, 20 may comprise or be configured from general purpose processors or any other computing device. Each correspondent device 12, 14 may also comprise internal or external memory or other computer readable media for storing computer executable instructions for enabling the cryptographic unit 18, 20 to perform cryptographic operations as is known in the art. In embodiments described below, the cryptographic units 18, 20 are configured to perform elliptic curve (EC) operations and may store or otherwise have access to the requisite system parameters for doing so. Memory or other storage media (not shown) may also be included in or otherwise be accessible to each cryptographic unit 18, 20 or correspondent device 12, 14 as necessary.

It will be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the cryptographic units 18, 20 or accessible or connectable thereto. Any application or module herein described may be implemented using computer readable/executable instructions that may be stored or otherwise held by such computer readable media.

At least one of the cryptographic units 18, 20 comprises, a module, function, processing unit, data structures, definitions or other structures embodied in software, hardware or both for providing an elliptic curve hash function 22 as will be explained below. As can be seen in FIG. 1, the hash function 22 takes a message M as an input and produces a hash value H as an output. The hash value H may then be provided to another cryptographic function or operation residing in the cryptographic unit 18, 20 or elsewhere in a wider cryptographic system as a sub-step or sub-operation in the cryptographic function. For example, the hash function 22 may be used as a portion of a signature verification operation, wherein the cryptographic unit 18, 20 receives a message M and a signature on the message M and hashes the message M in one or more operations in verifying the signature. Other examples include encryption, the generation of hash tables, and any other cryptographic operation that utilizes a hash function.

Exemplary Specific Implementations of Hash Function

Figure 2:
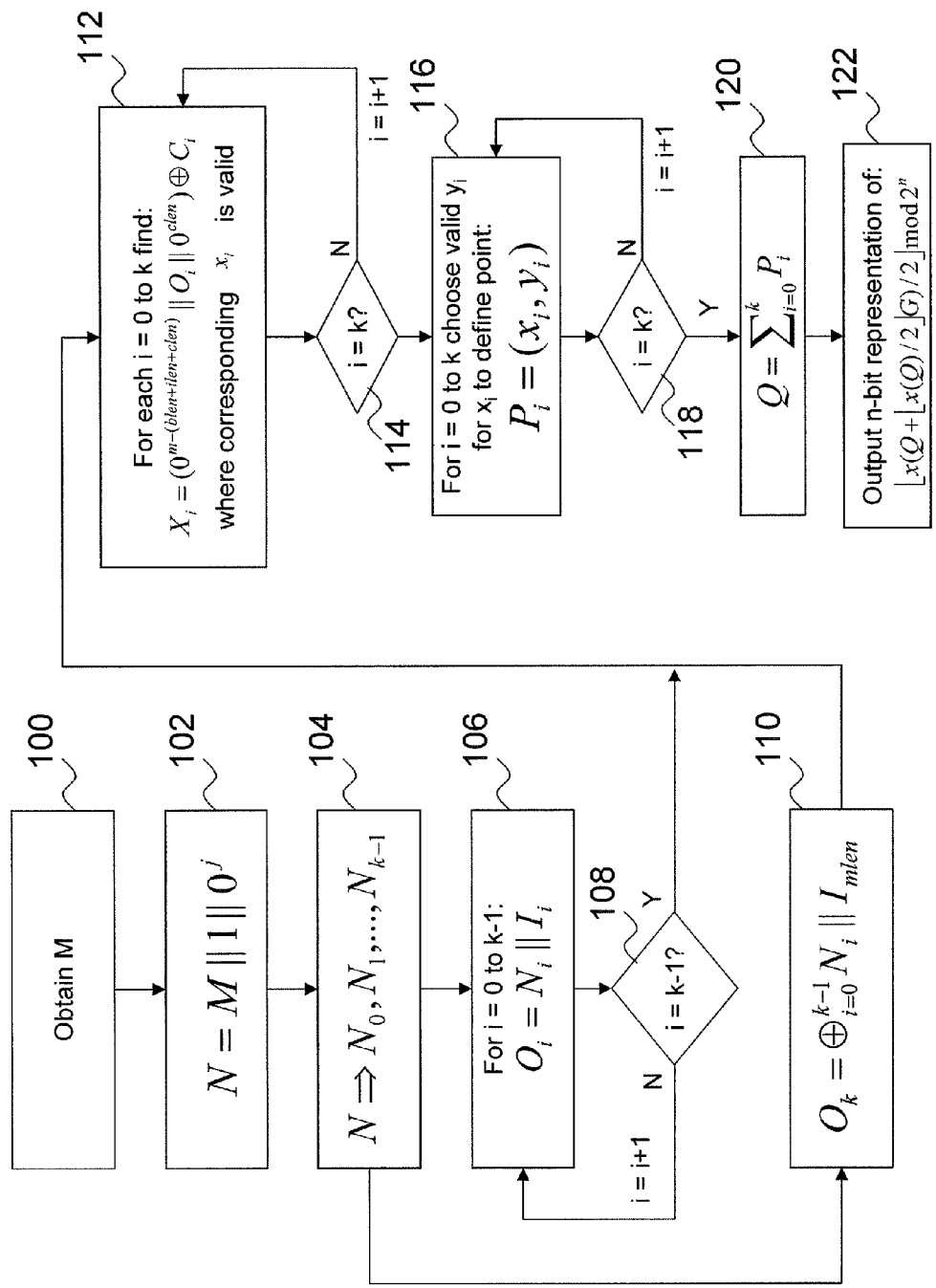
FIG. 2 is a flow chart illustrating operations performed in one embodiment of the hash function shown in FIG. 1.

Turning now to FIG. 2, an implementation of the EC hash function 22 shown in FIG. 1 is provided, which has been found to be particularly suited to various NIST curves. For ease of explanation, the hash function 22 in this example may also be referred to as the Elliptic Curve Only Hash (ECOH). The operations shown in FIG. 2 are generalized such that substitution of corresponding parameters for specific curves may be done as will be exemplified below. Before describing the operations of the exemplary hash function 22, specific terminology will be explained below to facilitate the understanding of the pseudo-code represented in FIG. 2.

Table 1, which is listed below, defines various common variables used in the subsequent examples.

TABLE 1

| | Variable Definitions |
|---|---|
| n | Length of the output hash value, in bits |
| M | The input message to be hashed, a bit string |
| mlen | Length of the input message to be hashed, in bits |
| m | Length in bits of finite field elements |
| q | Field size (e.g. $q = 2^m$) |
| blen | Length of each message block |
| ilen | Length of each index block |
| clen | Length of each counter block |
| i | Index of message blocks |
| j | Number of zero bits used to pad |
| k | Number of message blocks |
| E | Elliptic curve |
| G | A fixed point on the elliptic curve |
| N | A bit string obtained by padding M to a length which is a multiple of blen |
| Ni | A substring of N of length blen |
| Ii | A bit string of length ilen representing integer i |

TABLE 1-continued

| | Variable Definitions |
|---|---|
| Oi | A bit string of length blen + ilen |
| Xi | A bit string represented the x-coordinate of point |
| Pi | An elliptic curve point |
| xi | A finite field element, the x-coordinate of $P_i$ |
| yi | A finite field element, the y-coordinate of $P_i$ |
| Q | An elliptic curve point |

Table 2, which is listed below, defines various operators and constants appearing in the subsequent examples to clarify the corresponding operations in the context of the examples.

TABLE 2

| | Operator and Constants - Definitions |
|---|---|
| ‖ | Concatenation of bit strings. For example 0011101 ‖ 110110 = 0011101110110 |
| ⊕ | Bit-wise exclusive of bit strings, which should be equal length. For example: 000111 ⊕ 110110 = 110001 |
| $0^j$ | Bit string of length j consisting of all zero bits. For example, $0^7 = 0000000$ |
| 1 | Bit string of length 1 consisting of a single one bit, or the integer, or finite field element, or polynomial over a finite field |
| O | The point at infinity on an elliptic curve. Defined to be the identity element of the elliptic curve group |
| (,) | Coordinates of a point. For example, (x,y) = (0,1) is a point on the curve $y^2 + xy = x^3 + 1$ |
| + | Integer addition, finite field addition, finite field polynomial addition, or elliptic curve addition, depending on context. For example: 2 + 3 = 5; x + x = 0; (0,1) + (0,1) = O |
| $\sum_{i=0}^{k}$ | Addition of elliptic curve points indexed from i = 0 to i = k |
| x | Integer multiplication, or finite field multiplication, polynomial multiplication, or elliptic curve scalar multiplication, depending on context. That is, xy means the product of x and y. For numbers and multi-letter variables, parentheses are used or an explicit x may be used indicate multiplication. For example, i(blen) is i times blen, and 7(11) = 77, and x(x + 1) = $x^2$ + x, and 2(0,1) = O |
| $a^b$ | Integer exponentiation, finite field exponentiation, or polynomial exponentiation, depending on the type of a. In all cases, b is non-negative integer. For example, $2^3$ = 8, and $(x + 1)^3 = x^3 + 3x^2 + 3x + 1$. |
| / | Rational number division or finite field division or polynomial division. For example, 6/2 = 3 and $(x^2 + x) = (x + 1)/x$ |
| ⌊ ⌋ | ⌊x⌋ is largest integer not exceeding x. For example, ⌊3/2⌋ = 1 and ⌊5⌋ = 5 |
| ⌈ ⌉ | ⌈x⌉ is smallest integer not less than x. For example, ⌈3/2⌉ = 2 and ⌈5⌉ = 5 |
| $F_q$ | Finite field with q elements. |
| ⟨⟩ | ⟨G⟩ is the cyclic subgroup of elliptic curve group generated consisting of all elements nG for integers n |
| $A_i$ | A sequence or array of bit strings or elliptic curve points, indexed by i, and A is some variable name, which may also have a value when used alone. For example, perhaps $B_0$ = 000; $B_1$ =110; and $B_2$ = 010 could be a sequence of bit strings, whereas B may also indicate 0001 |
| x(P) | The integer whose bit string representation equals the bit string representation of the x-coordinate of the elliptic curve point P. An exceptional case is that x(O) is defined to be 0 |
| x mod m | The unique integer r such that 0 ≤ r < m and x = qm + r for some integer q. Known as the remainder. Defined similarly for polynomials, using degrees |

The pseudo-code in FIG. 2 can be adapted to various curves, and four implementations are considered for the purpose of describing this embodiment, namely ECOH-224, ECOH-256, ECOH-384, and ECOH-512. Table 3, which follows below, outlines the parameters for each of these implementations.

TABLE 3

Parameters for ECOH Implementations

| Hash | n | E and G | m | blen | ilen | clen |
|---|---|---|---|---|---|---|
| ECOH-224 | 224 | B-283 | 283 | 128 | 64 | 64 |
| ECOH-256 | 256 | B-283 | 283 | 128 | 64 | 64 |
| ECOH-384 | 384 | B-409 | 409 | 128 | 64 | 64 |
| ECOH-512 | 512 | B-571 | 571 | 256 | 128 | 128 |

As discussed above, the hash function 22, in this example implementation of ECOH, takes a message M as an input and outputs a hash value H without relying on a pre-existing hash function to randomize the message blocks. Referring to FIG. 2, at 100, the message M is obtained, for example by receiving M as an input either from an internal or external source or by obtaining M from memory. At 102 a padded message N is generated by concatenating the message M with a 1 and a series of j zeros, wherein j is chosen to be the smallest non-negative integer such that the length of the padded message N is divisible by blen. In this way, the padded message N can be divided into equal length blocks.

The padded message N is then parsed or divided at 104, into k equal length blocks of blen bits, namely $N_0, \ldots N_{k-1}$. It can be seen that the blocks are indexed from 0 to k−1. Each of the blocks $N_i$ are then indexed at 106 by computing a corresponding $O_i = N_i \| I_i$, where $I_i$ is the ilen-bit representation of the integer i. In other words, to each block, the bit representation of an index is added and the index is incremented for each block. The loop runs through each of the blocks until i is found to be equal to k−1 at 108, namely the last block has been indexed.

A tail indexed block $O_k$ is also generated at 110, using the blocks $N_i$ resulting from the parsing performed at 104. The tail block $O_k$ is generated by performing successive bitwise exclusive-OR operations of the $N_i$ blocks and concatenating the result with $I_{mlen}$, which is the ilen-bit representation of the integer mlen: $O_k = N_0 \oplus N_1 \oplus \ldots \oplus N_{k-1} \| I_{mlen}$. It may be noted that a condensed notation for the successive exclusive-OR operations is shown in FIG. 2 for brevity. The tail block $O_k$ is a concatenation of a checksum $N_k$ (where $N_k = \oplus_{i=0}^{k-1} N_i$) and an index value in order to generate a block of equal length as the other O values. As a result, the routine proceeds by operating on k+1 blocks.

The O blocks, including each $O_i$ from i=0 to k (i.e. including the tail indexed block $O_k$), are then padded to initialize a bit string $X = 0^{m-(blen+ilen+clen)} \| O_i \| 0^{clen}$, wherein $0^{m-(blen+ilen+clen)}$ and $0^{clen}$ are each a series of zeros that when concatenated with $O_i$ as shown above, create an m bit string X. Using this value X, an integer counter variable c is initialized to 0. For each block, a sub-loop is performed where c is incremented at each stage of the sub-loop to generate candidate values for $X_i$, the result being shown at 112 in FIG. 2. In particular, an m bit string $C_i$, representing the counter c at each iteration is exclusive OR'd with X as follows: $X_{i,c} = X \oplus C$. Next, each $X_{i,c}$ is converted to a finite field element $x_{i,c}$ according to the following mathematical relationship: $x_{i,c} = \rho^{-1}(X_{i,c})$, where $\rho$ is a representation of generalized parameters for converting from field elements to bit strings.

The candidate $x_{i,c}$ value is tested as follows. If there exists a field element y such that $(x_{i,c}, y)$ is an element of the group $\langle G \rangle$, then $x_{i,c}$ is valid, otherwise, $x_{i,c}$ is invalid. The sub-loop runs until a valid $x_{i,c}$ is found. The result is an x-coordinate $x_i$ for block $N_i$. The final value of the counter, i.e. the $C_i$ value that produces the valid candidate, is $c_i$, which is the smallest non-negative integer such that $x_{i,c}$ is valid.

In summary, steps 112 and 114 involve a main loop (114) for each indexed block $O_i$ to generate a valid x-coordinate $x_i$. The valid x-coordinate $x_i$ is found by searching a series of candidate $x_i$ values generated using a sub-loop (within 112) that increments a counter until a valid $x_i$ is found. Since each x coordinate has two possible y coordinates, in order to identify a point P on the curve E, each $x_i$ value is then used in 116 to generate a point $P_i$, such that the rightmost bit of the value $y_i/x_i$ equals the leftmost bit of the corresponding block $N_i$. The loop executes until 118 is satisfied, namely when a point is chosen for each block.

A prehash or total point Q is then computed at 120 by summing the points $P_i$ from i=0 to k. It is noted that the summation in step 120 is in the elliptic curve group and does not represent addition in the finite field or ring of integers. The output hash value H is then obtained from Q using the formula shown in FIG. 2, producing an n-bit representation of the hash of M. It can be seen that obtaining H from Q involves several operations and FIG. 2, step 122 shows a condensed formula incorporating such operations. Further detail pertaining to each of these operations is provided below. It may be noted that, as outlined above, the notation x(Q) represents the integer whose bit string representation equals the bit string representation of the x-coordinate of the elliptic curve point Q.

According to the implementation shown in FIG. 2, the maximum bit length of a message that can be hashed is $2^{ilen}-1$.

The operations described above and shown in FIG. 2 can also be represented by the following pseudo-code:

---

1. Let $N = M \| 1 \| 0^j$ with j chosen to be the smallest nonnegative integer such that the length of N is divisible by blen.
2. Parse N into blocks $N_0, \ldots, N_{k-1}$; each of length blen bits.
3. Let $O_i = N_i \| I_i$, where $I_i$ is the ilen-bit representation of the integer i, for i from 0 to k.
4. Let $O_k = \oplus_{i=0}^{k-1} N_i \| I_{mlen}$ where $I_{mlen}$ is the ilen-bit representation of the integer mlen.
5. Let $X_i = (0^{m-(blen+ilen+clen)} \| O_i \| 0^{clen}) \oplus C_i$ where $C_i$ is the bit string of length m representing the smallest nonnegative integer c such that $X_i$ represents an the x-coordinate $x_i$ of an element of $\langle G \rangle$.
6. Let $P_i = (x_i, y_i)$ be such that the rightmost bit $y_i/x_i$ equals the leftmost bit of $N_i$.

7. Let $Q = \sum_{i=0}^{k} P_i$.

8. Output H as the n-bit representation of $\lfloor x(Q + \lfloor x(Q)/2 \rfloor G)/2 \rfloor \mod 2^n$.

---

It can be appreciated that the four ECOH implementation outlined in Table 3 above can be implemented by instantiating the general pseudo-code above with the corresponding parameters. For example, the following pseudo-code represents an implementation of ECOH-224 using the curve B-283, the generator point G, with parameters (blen, ilen, clen)=(128, 64, 64):

---

1. Let $N = M \| 1 \| 0^j$ with j chosen to be the smallest nonnegative integer such that the length of N is divisible by 128.
2. Parse N into blocks $N_0, \ldots, N_{k-1}$; each of length 128 bits.
3. Let $O_i = N_i \| I_i$, where $I_i$ is the 64-bit representation of the integer i, for i from 0 to k.
4. Let $O_k = \oplus_{i=0}^{k-1} N_i \| I_{mien}$ where $I_{mien}$ is the 64-bit representation of the integer mlen (note mlen will vary based on the size of the message being hashed and thus is not fixed in any implementation).

-continued

5. Let $X_i = (0^{27} \| O_i \| 0^{64}) \oplus C_i$ where $C_i$ is the bit string of length 283 representing the smallest nonnegative integer c such that $X_i$ represents an the x-coordinate $x_i$ of an element of $\langle G \rangle$.

6. Let $P_i = (x_i, y_i)$ be such that the rightmost bit $y_i/x_i$ equals the leftmost bit of $N_i$.

7. Let $Q = \sum_{i=0}^{k} P_i$.

8. Output H as the 224-bit representation of $\lfloor x(Q + \lfloor x(Q)/2 \rfloor G)/2 \rfloor \bmod 2^{224}$.

The other ECOH implementations can be similarly constructed by using the specified curve and values for (blen, ilen, clen), m and n. As such, the pseudo-code therefor will be omitted herein for the sake of brevity.

Generalized ECOH

The above examples are tailored to implementing the hash function 22, namely ECOH using the parameters outlined in Table 3. It will be appreciated that the principles of ECOH as discussed above can be generalized as shown in FIG. 3. At 150, the message M is obtained by the hash function 22. A bit string pre-processing phase is then performed at 152, which in general involves the padding and indexing exemplified in steps 102-110 in FIG. 2. An EC pre-processing phase is then performed at 154, which involves searching for corresponding elliptic curve points for each block generated in phase 152. The points are then summed at 156 in an EC summation phase to generate a prehash. The prehash then undergoes an EC post-processing phase at 158 to covert the point back to an integer bit string and the integer bit string is then post-processed at 160 to generate the hash H as an output value at 162.

Figure 3:
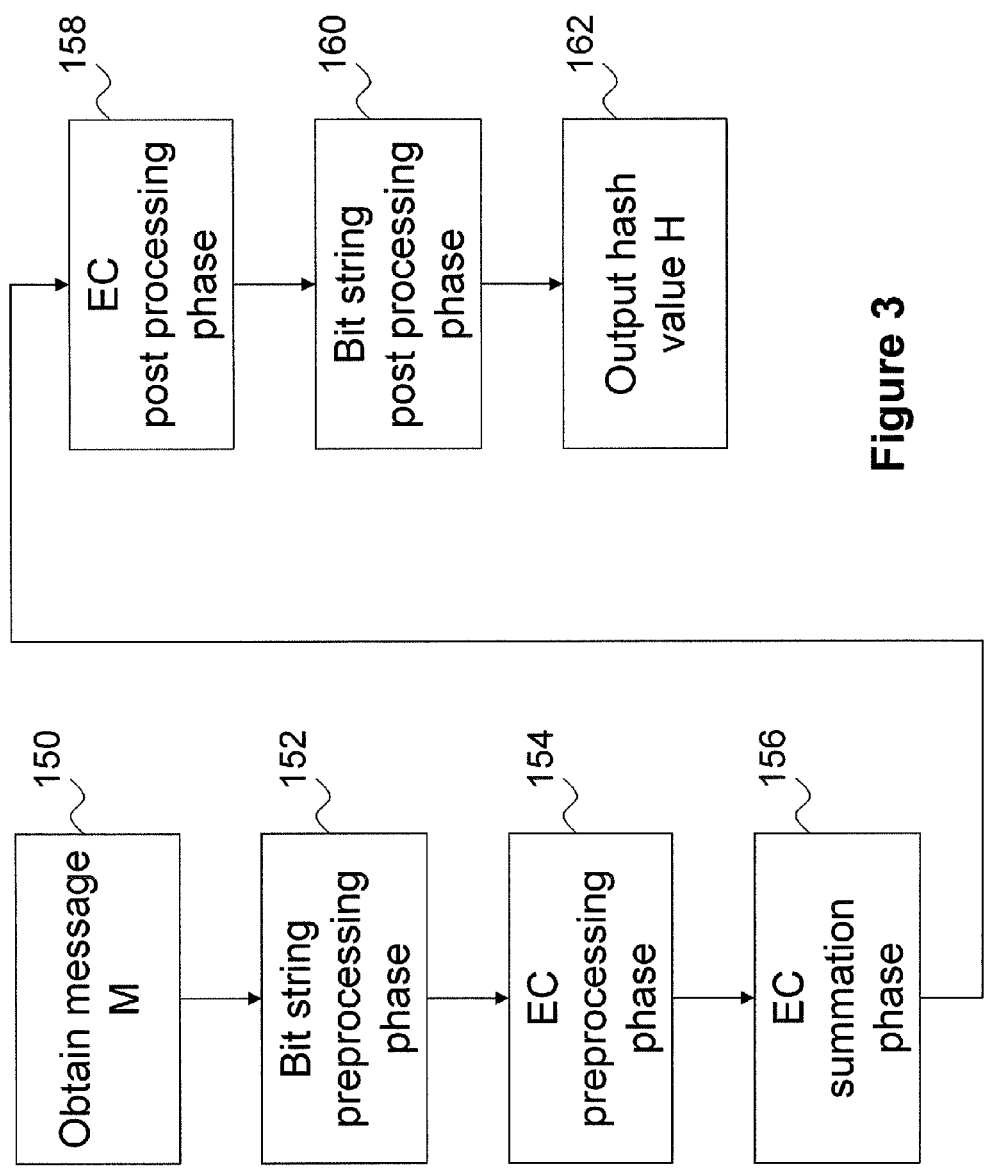
FIG. 3 is a flow chart illustrating generalized phases performed by an elliptic curve only hash version of the hash function of FIG. 1.
Figure 4:
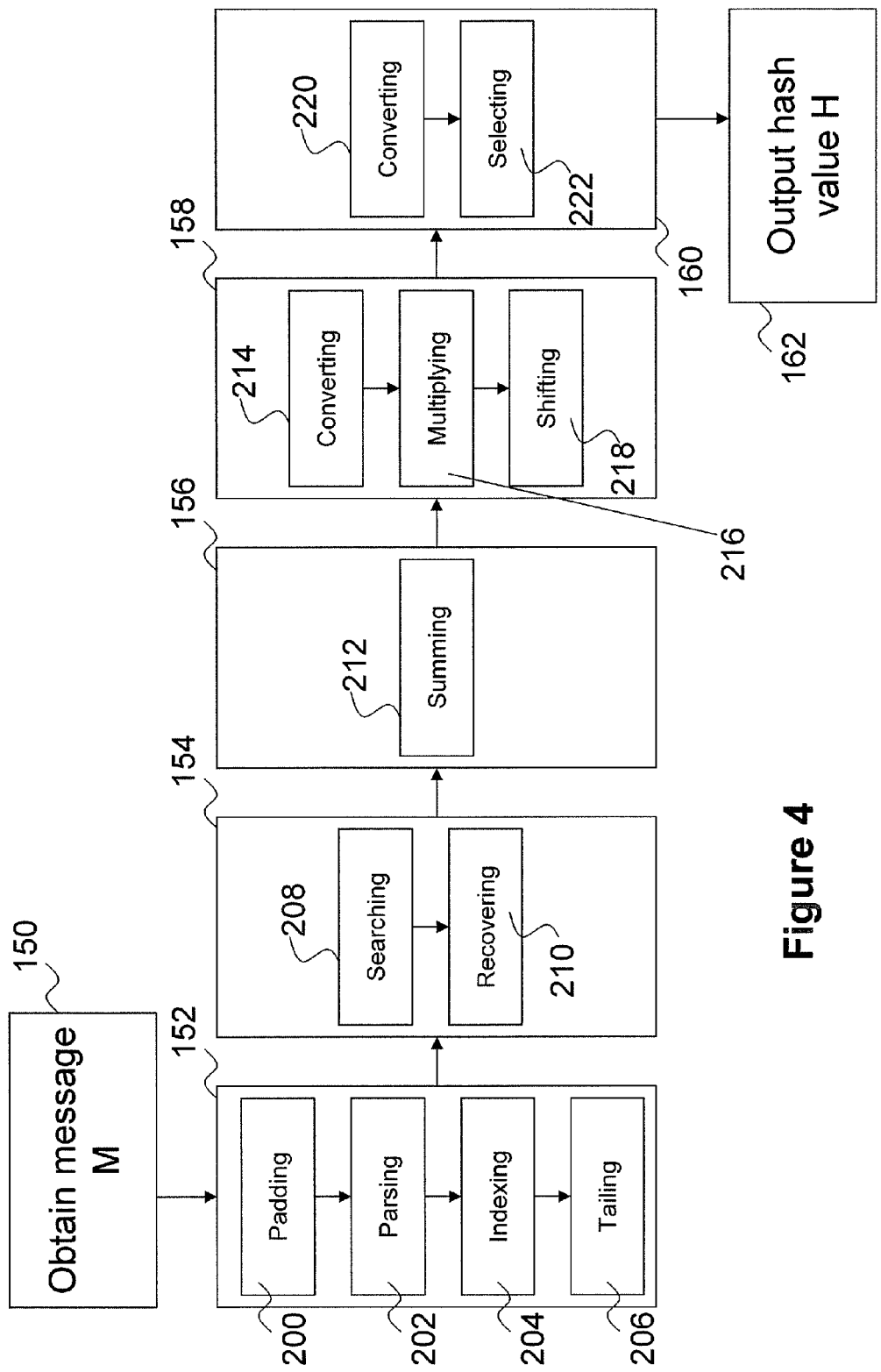
FIG. 4 is a flow chart illustrating sub-steps performed during the phases of FIG. 3.

As shown in FIG. 4, the generalized phases shown in FIG. 3 can be further broken down. For example, the bit string pre-processing phase 152 involves a padding stage 200 (e.g. step 102 in FIG. 2), a parsing stage 202 (e.g. step 104 in FIG. 2), an indexing stage 204 (e.g. steps 106-108 in FIG. 2), and a tailing stage 206 (e.g. step 110 in FIG. 2). The pre-processed bit strings may then undergo EC pre-processing 154 by performing a searching stage 208 to find valid candidates in the corresponding group (e.g. steps 112 and 114 in FIG. 2), and a recovering stage 210 to recover the corresponding other coordinate for a valid candidate that has been found in the searching stage 208 (e.g. steps 116 and 118 in FIG. 2). The EC summation phase 156 includes only a single summing stage 212 to produce the prehash or total point (e.g. step 120 in FIG. 2).

The EC post-processing phase 158 involves a first converting stage 214 followed by a multiplying stage 216 followed by a shifting stage 218. The bit string post processing phase 160 then involves a second converting stage 220 and a selecting stage 222. The stages within phases 158 and 160 are represented by way of example only in FIG. 2 as step 122 thus producing the output hash value of H in the output phase 162.

Before discussing the generalized stages shown in FIG. 4, a generalized ECOH has certain parameters which should be considered and chosen to ensure security according to the specific implementation:

Output length n bits. To ensure security, the length n is chosen according to the message size and the elliptic curve. The length n should be chosen from the group {224, 256, 384, 512} according to the environment and security requirements for example.

The binary field degree m, should be >n, e.g. 283, 409, 571 for the above values of n.

The binary field representation should be a bijection $\rho$: $F_{2^m} \to \{0,1\}^m$. For example, one recommended representation is a minimal Hamming weight irreducible polynomial basis representation where the left bits are the highest degree bits, or for the above examples, the representations given in FIPS 186-2 for B-283, B-409, and B-571 curves.

The elliptic curve parameters a, $b \in F_{2^m}$. For the above examples, the NIST curves B-283, B-409, and B-571 are recommended as appropriate with the other parameters.

The elliptic curve generator $G \in E(F_{2^m})$, also known as the base point, should be the cyclic subgroup $\langle G \rangle$ generated by G of the elliptic curve E: $y^2 + xy = x^3 + ax^2 \_b$ is not such that the discrete log problem in $\langle G \rangle$ is known to be solvable with computation less than the equivalent $2^{n/2}$ elliptic curve operations. For the examples above, the G including B-283, B-409, and B-571, as appropriate with other parameters is recommended.

For the elliptic curve subgroup index h, the order of G should be $|E(F_{2^m})|/h$. In various embodiments, it is recommended that $|E(F_{2^m})|/h$ be prime, in which case h can also be referred to as the cofactor, e.g. where h=2.

The message block size blen should be ≥96. It is recommended that blen=128 unless n=512, in which case blen=256. If appropriate, it is advantageous for blen≥128 or even 32|blen.

The index block size ilen should be ≥64. It is recommended that ilen=64 unless n=512, in which case ilen=128. If appropriate, it is advantageous for ilen≥128 or even 32|ilen.

The counter block size clen should be ≥64. It is recommended that clen=64 unless n=512, in which case clen=128. If appropriate, it is advantageous for clen≥128 or even 32|clen.

The number of bits dropped before integer conversion, the subset of {0, 1, . . . , m−1}, corresponding to the radix significance should be {0}, where 0 indicates the degree of the bit (i.e. the rightmost or last bit here).

Any unsigned integer encoding should be as bit strings of a given length, with lower radix bits on the right. It is recommended that consistency with the polynomial basis representation be used, so the higher degree bits correspond to higher radix bits.

The bits kept after integer conversion to the hash output (e.g. during step 122 in FIG. 2) should be a subset of {0, 1, . . . , m−2}, corresponding to radix significance. It is recommended that the n least significant bits {0, 1, . . . , n−1} be kept.

In addition to the parameters already discussed, there are four additional parameters $\beta$, $\omega$, $\in$, and $\alpha$, which will be discussed below with respect to the generalized ECOH. For the purposes of the above-described examples, it will be shown that three of the generalized parameters are identical. The generalized parameters would typically be hardcoded into the pseudocode for the particular implementation but may be variable when designing the appropriate algorithm.

The shift factor $\beta$ is either 0 or 1 and in the above-described implementations, $\beta=1$. The tail obfuscator $\omega$ is also either 0 or 1. If $\omega=1$, then blen≥128, as was the case in the above examples. It is however recommend that $\omega=0$ as will be explained further below. The encryptor flag $\in$ is one of the group {0, 1, 2, 3} and, as is the case in the above examples, it is recommended that $\in=0$. The addition flag $\alpha$ is either 0 or 1 and, $\alpha=0$ is recommended.

Turning back to FIG. 4, each of the sub-stages 200-222 will now be explained in modular pieces to illustrate the generalized ECOH algorithm. As discussed above, the input, obtained at step 150, is a message M, which is a bit string of arbitrary length. The length of M in bits is denoted by mlen.

In the padding stage 200, the message M is padded with a single 1 bit and then with the minimal number of 0 bits needed to obtain a bit string whose length is a multiple of blen. Using ∥ to indicate bit string concatenation, 0j to indicate a string of length j all of whose bits are 0, and (a mod b) to indicate the remainder of a divided by b, then the formula for N may also be expressed as: $N=M\|1\|0^{((-1-mlen) \mod blen)}$. It may be noted that the length N as a bit string may be expressed as:

$$blen \left\lceil \frac{1 + mlen}{blen} \right\rceil,$$

where $\lceil x \rceil$ indicates the smallest integer i≥x. By letting $$k = blen \left\lceil \frac{1 + mlen}{blen} \right\rceil,$$

the bit length of N is kblen. k may also be referred to as the block count.

In the parsing stage 202, the padded message N is parsed into k blocks, each a bit string of length blen bits. The blocks are indicated as $N_i$, where i is an integer and 0≤i≤k. Using concatenation notation ∥, N may be represented by: $N=N_0\|N_1\| \ldots \|N_{k-1}$. Using array indexing of bit strings, where B[j] is the bit of the bit string B at a distance of j bit positions from the leftmost bits of B (so that B[0] is the leftmost bit, for example), then $N_i$ may be expressed as the unique bit string of length blen such that: $N_i[j]=N[j+i(blen)]$, for all integers j with 0≤j≤blen.

In the indexing stage 204, each parsed block $N_i$, for integers 0≤i<k, is processed to obtain an indexed block $O_i$ as follows: $O_i=N_i\|I_i$; where $I_i$ is the bit string of ilen representing the unsigned integer i. $O_i$ may also be referred to as a body indexed block.

In the tailing stage 206, as discussed above, a checksum $N_k$ is computed, where: $N_k=\oplus_{i=0}^{k-1} N_i = N_0 \oplus N_1 \oplus \ldots \oplus N_{k-1}$, where ⊕ indicates the bit-wise exclusive-OR operation upon bit strings. A tail indexed block $O_k$ is then computed as: $O_k=N_k I_{mlen}$; where $I_{mlen}$ is the bit string of length ilen representing the length mlen of the original input message M. It may be noted that $I_{mlen} \neq I_k$ (unless mlen=1) and, as such, the index portion of $O_k$ generally does not represent the integer k as could be erroneously interpolated from the index portions of the previous values $O_i$. In other words, the index portion of $O_k$ is higher as an integer by a factor of about blen than the index portion of $O_{k-1}$.

If ω=1 (which requires blen≥128), then the leftmost 127 bits of $N_k$ are not zero and are modified by first converting them to an integer w (which is nonzero). The polynomial $f(x) \equiv x^w \equiv \mod x^{127}+x+1$ is then computed. This is a polynomial of degree at most 126. This is converted to a bit string W of length 127 bits, where the leftmost bit is the coefficient of $x^{126}$ and so on. Then, the leftmost 127 bits of $N_k$ are replaced by W.

In the searching stage 208, for each indexed block $N_i$, the following sub-loop is executed. An integer counter variable c is initialized to 0. The variable c will be incremented at each stage of the sub-loop. The following bit string of length m is initialized: $X = 0^{m-(blen+ilen+clen)}\|O_i\|0^{clen}$. At each iteration of the sub-loop, the counter c is represented as a bit string C of length m bits. Then the bit string $X_{i,c}=X \oplus C$ is computed.

For values of ∈≠0, the following extra transformation is performed on $X_{i,c}$.

a) If ∈=1, then let t=blen+ilen+clen. The rightmost t bits $X_{i,c}$ are represented as a finite field $F_{2^t}$, using polynomial basis representation with the least lexicographically irreducible polynomial. If this element is non-zero, then its inverse is computed and its bit string representation replaces the rightmost t bits of $X_{i,c}$. Note that ∈=1 may be considered as an extra safety margin for making certain attacks appear harder.

b) If ∈=2, then $X_{i,c}$ is transformed as follows. As few bits as possible are discarded from the left, so that the result has a length that is a multiple of 64 bits. Then AES key wrap is applied, using the AES-128 with key of all zero bits. As few bits as possible are discarded from the left so that that the length equals m. This is the transformed value of $X_{i,c}$. Note that ∈=2 may also be considered as a safety margin for making certain attacks appear harder and for making certain heuristic security arguments more plausible.

If ∈=3, then $X_{i,c}$ is transformed as follows. It may fed into another hash function and the resulting n bits then replace the rightmost n bits of the value $X^{i,c}$. Note that ∈=3 may be considered as an extra safety margin that appears to make certain attacks harder, and for making an algorithm that more closely resembles MuHASH, if desired.

Continuing with the searching stage 208, next, $X_{i,c}$ is converted to finite field element $x_{i,c}$, mathematically: $x_{i,c}=\rho^{-1}(X_{i,c})$, where ρ represents generalized parameters as explained above. The element $x_{i,c}$ is called a candidate x-value. The candidate x-value is tested as follows. If there exists a field element is called a candidate x-value. The candidate x-value is tested as follows. If there exists a field element y such that $(x_{i,c}, y)$ is an element of the group $\langle G \rangle$, then $x_{i,c}$ is valid. Otherwise, $x_{i,c}$ is invalid. The sub-loop runs until a valid $x_{i,c}$ is found. The result may be denoted as $x_i$. The final value of the counter may be indicated as $c_i$, where $c_i$ is the smallest non-negative integer such that $x_{i,c}$ is valid.

For the recovering stage 210, there will generally be two possible values of y that correspond to a valid $x_i$. One of these will be chosen according to the following criterion, and indicated as $y_i$. The chosen y-coordinate will be determined by the one which satisfies the following properties. When the field element $y_i/x_i$ is represented as a bit string of length m, its rightmost bit equals the leftmost bit of $N_i$. The point $(x_i, y_i)$ will then be indicated as $P_i$ and may be referred to as a term point.

In the summing stage 212, the point $$Q = \sum_{i=0}^{k} P_i = P_0 + \ldots + P_k$$

is computed. It may be noted that the summation in this stage 212 is in the elliptic curve group, rather than addition in the finite field or ring of integers. The point Q, as noted above, may also be referred to as the prehash or total point.

In the first converting stage 214, the x-coordinate x(Q) of elliptic curve point Q is converted to a bit string U=ρ(x(Q)). Some of the bits of U, as indicated by above the parameters are dropped, obtaining a bit string V. Then V is converted to an integer v. It may be noted that the recommended parameters indicate that the rightmost bit of U is dropped. In this case, if the x-coordinate of U, when represented as a bit string represents the integer u, then $v=\lfloor u/2 \rfloor$. The integer v may be referred to as the multiplier.

In the multiplying stage 216, the point S=vG is computed. It may be noted that this is an elliptic curve scalar multiplication, namely v copies of G summed using elliptic curve operations. The point S may be referred to as the total scaled point.

In the shifting stage 218, the point R=S+βQ is computed. Since β∈{0,1}, R∈{S,S+Q}. This point may be referred to as the shifted total. If α=1, then the x-coordinate of R and the x-coordinate of Q are converted to integers and added modulo $2^m$. The resulting integer is encoded into a bit string of length m. This is encoded into a finite field element. The resultant field element replaces the x-coordinate of the point R. The y-coordinate of R is not changed and is not used in the ensuing calculation. It may be noted that R, once modified in this way, is a point, but it is very unlikely to be on the elliptic curve in question.

In the second converting stage 220, the same point-to-integer conversion process applied to Q is applied to R. This conversion is restated explicitly as follows, with new variable names. The x-coordinate x(R) of R is converted to a bit string W=ρ(x(R)). Some of the bits of W as indicated by the parameters are dropped, obtaining a bit string Z. Then Z is converted to an integer h. It may be noted that the recommended parameters indicate that the rightmost bit of Z is dropped. In this case, if the x-coordinate of R, when represented as a bit string, also represents the integer r, then h=⌊r/2⌋. The integer h may be referred to as the integral hash.

In the selecting stage 222, the integral hash h is represented as a bit string F. Some subset, as indicated by the parameters of the algorithm, of the bits of F, are selected for inclusion in a bit string H of length n. It may be noted that for the recommended parameters above, the n rightmost bits of the bit string representation of h are used to form H.

Finally, in step 162, the bit string H of length n is the output of the ECOH hash function 22.

According to the above details pertaining to stages 214-222, and assuming β=1, the condensed expression representing h, as shown in step 122 of FIG. 2 can be found as follows. Since h=⌊r/2⌋, r=x(R), R=S+βQ, S=vG, and v=⌊u/2⌋:

$$h=\lfloor x(R)/2\rfloor=\lfloor x(Q+S)/2\rfloor=\lfloor x(Q+vG)/2\rfloor=\lfloor x(Q+\lfloor u/2\rfloor G)/2\rfloor=\lfloor x(Q+\lfloor x(Q)/2\rfloor G/2\rfloor$$

In other embodiments, the following suggested alternative values of the parameters may be implemented.

First, the choice of elliptic curve can affect the deterministic runtime. From certain implementation perspectives, the searching step of the generalized ECOH may be undesirable in that its runtime is nondeterministic. This can be overcome by use of different elliptic curve and binary field, as follows.

a) Use the binary field $F_{2^m}$, where m=2p for some prime p. It may be noted that $F_{2^p}$ is a subfield of $F_{2^m}$.

b) Use an elliptic curve with equation $y^2+xy=x^3+ax^2+b$ such that a,b∈$F_{2^p}$. In may be noted that due to the coefficients of the curve equation, the curve may be called a subfield curve.

c) Use an encoding of ρ: $F_{2^m} \to \{0,1\}^m$ such that elements of $F_{2^p}$ are mapped to bit strings whose leftmost p bits are zeros. For example, a tower of polynomial basis representation may be used to achieve this.

d) Choose parameters blen, ilen, clen such that mlen+ilen+clen≤p.

In this case, it can be shown that any candidate x-coordinate is such that $x_{i,c} \in F_{2^p}$ (not just in $F_{2^m}$). Each element in $F_{2^p}$ will be the x-coordinate of a point on the curve with y-coordinate in $F_{2^m}$. Therefore, the only remaining condition on $x_{i,c}$ is that it also belong subgroup generated by G.

There exists efficient algorithms to test if a point on the curve is also in the subgroup generated by G, using only the x-coordinate of that point. Also, it can be shown that for about half of all field elements in $F_{2^p}$ the resulting y-coordinate will also be in $F_{2^p}$. In the other half of x-coordinates in $F_{2^p}$, it is possible to transform the point on the curve to the twist of the curve with both coordinates in $F_{2^p}$. In both cases, it is possible to work entirely over the field $F_{2^p}$ rather than $F_{2^m}$, at least until the final total point needs to calculated.

It may be noted that Satoh and others have developed very efficient point counting algorithms for binary curves. Therefore, it is possible to fix some a, e.g. a=0, and then choose random b∈$F_{2^p}$, until one obtains a curve and its twist, whose orders are twice a prime and four times another prime, respectively, or vice versa.

For an inverted form of ECOH, the generalized ECOH with parameter value ∈=1 can thwart the most plausible collision finding attack on ECOH.

The ECOH can also provide an incremental mode of operation. If one has compute the ECOH hash H of a message M, and then a small change is made to the message, such as the re-assignment of certain bits, to obtain another message M', it is possible to accelerate the computation the ECOH hash H' of message M' by using some of the intermediate computations in the computation of the hash of H.

More precisely, let M' and M have bit lengths mlen' and mlen, respectively, and let Δ=M'⊕M, where whichever one of M or M' is shorter, that value is extended by padding with zero bits on the right. If Δ is sufficiently sparser than M', then given M' and Δ, and certain intermediate values in computation of M, it is possible to compute H' more quickly than computing H' directly from M'.

The intermediate values to allow accelerated computation of M, are mlen, Q and $N_k$ (before obfuscation). The bit strings Δ and $N_k$ are used to compute the revised checksum $N'_k$ before obfuscation, by parsing Δ into appropriately sized blocks, and XORing all of these into $N_k$. The revised total point Q' can also be computed by subtracting off any old contributions from M that differ from those of M' (which may be located using Δ) and then adding the corresponding contributions of M'.

It may be noted that ECOH, in this mode of operation, like MuHASH, is incremental only the sense of in-place changes. In particular, insertions and deletions are not supported.

However, insertions and deletions could be handled by using a different data structure, such as a linked list or tree. For example, suppose that the actual content is a bit string. Before hashing the content undergoes two conversions. The first is a conversion to a more flexible data structure, such as a linked list. The second is a conversion back to a bit string. Note that the resulting bit string would generally be considerably longer than the content bit string, because it encodes the overhead information in the data structure used, such as the link pointer addresses in the link list records. This longer bit string is fed into the ECOH algorithm.

When an insertion occurs in the original bit string content, the linked list may generally updated by the creation of new records, and changing a few link pointer addresses. When this revised linked list is encoded as a bit string, the link changes are in-place changes, while the new records may be added to the tail of the old the bit string. This therefore allows accelerated computation of the revised ECOH hash.

When a deletion occurs in the original bit string content, the linked list may generally be updated by the changing of a few link pointer addresses, and by dropping a few records, and perhaps creation of a few new records. When this revised linked list is encoded as a bit string, the link changes are in-place changes, and the creation of new records, can be done by appending them to the end of the bit string. The dropped records may be have encoded somewhere in the middle of the bit string. These records are not pointed to in the revised bit string, so they may be left there, effectively ignored. Again all changes are in-place so computing the ECOH hash of the revised bit string can be accelerated.

There are various applications for the EC hash function 22 (i.e. the ECOH in whatever implementation) in many cryptographic operations.

Currently, SHA-1 and SHA-2 have, in 4 main applications in NIST standards: a) computing message digests in digital signature schemes, e.g. ECDSA; b) message authentication, i.e. HMAC; c) key derivation for key agreement, e.g. Concatenation KDF; and d) pseudorandom number generation, e.g. Hash-based DRBG. ECOH can be adapted to be used in place of SHA-1 and SHA-2 in these applications.

The following sections discuss how to apply ECOH in the five cases above, directly, and in some cases, in an alternative manner.

When using ECOH in a digital signature scheme, such as ECDSA, one can just take the output of ECOH and use it is the same manner as one would use say SHA-2. When using ECDSA with the same curve as used in ECOH, the elliptic curve implementation can be common to both algorithms, thereby providing a slightly smaller implementation. Furthermore, instead of truncating the most significant bit as the final step of ECOH, an alternative would instead be to be truncate only the least significant bit of the x-coordinate of the final point. This yields a hash output of size approximately n, which may strengthen the collision resistance.

In order to directly substitute ECOH in the HMAC construction, let us first consider ECOH fits into such a construct, which we may call HMAC-ECOH for the purpose of this discussion. The design of HMAC is directly geared towards an iterated compression function, using the Merkle-Damgard construction. As ECOH does not use this construction, the security proof of HMAC does not apply directly. Despite ECOH not being theoretically ideal for HMAC, no attacks are believed to be apparent.

It may be noted that MuHASH is incremental (in the sense of replacement of parts), and considerably more so the MD construction (which is only incremental in the sense of extension). Part of the design of HMAC is to avoid extensibility becoming a liability. Given the greater incrementality of MuHASH, and thereby of ECOH (with respect to the intermediate value), it should be determined whether this greater incrementality becomes a liability when trying to MAC, particularly when using the HMAC-ECOH construction.

It has been recognized that in ECOH, its hash is not directly incremental. As discussed above, its incrementality is only achievable when an intermediate point is retained. In other words the simpler of construction of: MAC(K,M)=ECOH (K∥M) should be secure already. The HMAC-ECOH doubles this and thus should also be secure.

It will be appreciated that the ECOH hash function 22 can also be used for various other applications such as key derivation, pseudorandom number generation, randomized hashing, among others.

Efficiency Analysis

In the following, the efficiency of ECOH is discussed. The first consideration is the reference implementation.

It has been found that the reference implementation of ECOH may give it a rate of about 1000 times slower than SHA-1 for long messages. About three quarters of the time that the reference implementation requires to compute an ECOH digest of a long message, computing is spent computing inverses of elements in the field over which the elliptic curve is defined. Each message block requires about 3 inversions on average to computed. Of these, 2, on average, are needed to find a point on the curve. The third inverse is needed to used in the point addition formula, because the reference implementation uses affine coordinates.

In the examples provided above, affine coordinates were chosen over projective coordinates, because affine coordinates run faster with current processors. More specifically, the cost T of finite field multiplication (in binary fields)—and the cost L of finite field inversion (in binary fields) have a ratio T/L≈7. Projective coordinates avoid an inversion in point addition formula but use at least 8 more multiply operations, which is more expensive than an inversion.

Of the remaining quarter of the time that the reference implementation required for the ECOH hash of a long message, is spent on finite field multiplication. Most of this time is spend on binary polynomial multiplication, which is implemented using combing. For short messages, the scalar multiplication in the post-processing stages requires relatively more time.

The optimized implementation differs from the reference implementation as follows. First, it uses the almost inverse algorithm, instead of the Euclidean algorithm for computing inverses. Second, it may be able to unroll some loops. Third, it should be about twice as fast as the reference implementation.

Hardware specific assembly optimization can sometimes result in more efficient executables than, e.g., compiled C source code. The above-described reference and optimized implementations are not limited to any specific assembly. That is, they may be written entirely in C, and rely entirely on the compiler for assembling. It may be true that use of hand assembly could make the ECOH faster for certain platforms.

Simultaneous inversion, introduced by Peter Montgomery, trades k inversions for 1 inversion and 3(k−1) multiplications. Therefore, provided that I/M>3, then using simultaneous inversion should yield a speed up for ECOH, since most of the time of ECOH is spent on inversion. The theoretical benefit of simultaneous inversion, for long messages, is to reduce one unit of time to $$\frac{3}{I/M}\frac{3}{4}+\frac{1}{4},$$

assuming fraction of the time spent on inversion if ¾ and that k, the number of inversions done simultaneously, is chosen to be sufficiently large. Taking I/M=7, makes ECOH a little less than twice as fast. That being said, however, simultaneous inversion has some overhead costs, of determining which inversion to do simultaneously.

Advanced Vector Extensions (AVX) are a new set of instructions to be added to processors produced by Intel®. Included in AVX is an instruction PCLMULQDQ which may be useful for making elliptic curve cryptography over binary fields more efficient. Gueron and Kounavis suggest an approximate 21 or 66 times speed up of scalar multiplication. To get this, they assumed a reasonable cost of the PCLMULQDQ instruction. They compare projective coordinates implemented with PCLMULQDQ to affine coordinates implemented with combing multiplication and a variant of the Euclidean algorithm. Since projective coordinates replace one inversion with 8 multiplies one may infer that they find I/M≈(8)(21)=168. This does suggest that with AVX, the ratio I/M may become considerably larger.

With so large a value I/M, it may make more sense to use projective coordinates and simultaneous inversion. Given the estimates above, it is expected, that the speed of ECOH can be increased many times (e.g. 25 times) over the reference implementation, if implemented with a improvement such as AVX, and using simultaneous inversion.

In terms of parallelization, the ECOH algorithm is parallelizable in the following ways: a) the search and recovery of the term points may be done in parallel; b) computing the checksum may be done in parallel; c) computing the total point from the term points may be done in parallel; and d) computing the scalar multiply may be done in parallel, if a sufficiently large table is used.

Parallelization requires special hardware, and the amount of parallelization depends on the hardware and on the message size. It should be noted that simultaneous inversion requires a serial sequence of multiplication operations. For short messages, therefore, it may be possible to benefit from both simultaneous inversion and parallelization of the point searching, recovery and additions. For longer messages, grouping a moderate number of simultaneous inversions together should capture almost of the benefits of simultaneous inversion, and then, because there are many of these grouped inversions, the benefits of parallelization can be obtained by doing these multiple simultaneous inversions in parallel.

For example, if the hardware permits 40 parallel operations and quick AVX binary polynomial multiplication operations, then for sufficiently long messages where simultaneous inversions gives, e.g. 25 times speedup over the reference implementation, then the parallelism will give another 40 times speedup, for a final speedup of 1000 times. In this case, ECOH would have a speed comparable to SHA-1.

Security Analysis

A discussion of the security of ECOH will now be provided. For the sake of concreteness, the scope of this discussion is limited to the assessment of various plausible attack strategies. A more theoretical analysis involving reductionist security arguments, sometimes known as proofs of security, follow the general discussion. The following focuses on the specific implementation illustrated in FIG. 2.

The first security issue to address is collision resistance. A collision in hash function H is a pair of messages (M, M') such that M≠M' but H(M)=H(M'). Any hash function with a larger domain than range should have a collision. In theory, there exists an efficient algorithm, namely one that outputs M and M' directly to find a collision. In practice, we do not necessarily know how to find this algorithm. To speak of collision resistance, therefore, means to measure the efficiency of all known algorithms that can find collisions. The following lists some collision finding algorithms.

A. The Birthday Attack.

The birthday collision finding algorithm is as follows. Fix some finite message space, such as all bit strings of length 4n; choose a random message from the message space; compute its hash; and repeat until two of the hashes computed are identical. Note the birthday collision finding algorithm is defined to any hash function.

Consider the heuristic assumption that, when the inputs are uniformly distributed in the message space, the hash function's outputs, the hash outputs are nearly uniformly randomly distributed in the hash output range. For message spaces sufficiently large and independent of the hash function's definition, such as all bit strings of a given length larger than n, then this heuristic seems reasonable if the output of the hash function appears pseudorandom. Under this heuristic, the birthday collision finding algorithm is expected to find a collision after computing about $2^{n/2}$ hash values.

However, the heuristic can fail for certain message spaces. If the message space is too small, such then the outputs may not be uniformly distributed. For example, if the message space is all bit strings of length n/2, then there can at most be $2^{n/2}$ outputs, and therefore most outputs will not occur. In this case, the birthday collision finding algorithm will fail. The heuristic can also fail for large message spaces if they more dependent on the hash function. For example, if the message space is defined to be all message whose hash is the all zeros bit string. With this type of failure of the heuristic, the birthday collision finding algorithm finds collision faster. Practically, such message spaces, although they exist, may not be amenable to efficient sampling of random elements. Therefore, it seems reasonable that the birthday collision finding algorithm will find collision at a cost of about $2^{n/2}$ hash evaluations or fewer provided the message space used is sufficiently larger than 2n and that the message space can be sampled efficiently.

The birthday collision finding algorithm is considered to be the benchmark by which other collision finding algorithms are compared.

B. Semaev Summation Polynomial Attack.

This collision finding attack strategy attempts to find a collision in the x-coordinate of the total point (prehash) Q, using Semaev's summation polynomials, which are now reviewed. Let F be a finite field. Let E be an elliptic curve E with Weierstrass equation having coefficients in F. Let O denote the point of infinity, which is the identity (neutral) element of the elliptic curve group. Semaev proved that there exists a multivariable polynomial $f_n=f_n(X_1, \ldots X_n)$ with the following property. For any $x_1, x_2, \ldots, x_n \in F$, there exists $y_1, y_2, \ldots, y_n$ such that $(x_1,y_1)+ \ldots +(x_n,y_n)=O$ if and only if $f_n(x_1, \ldots, x_n)=0$. Furthermore, the polynomial $f_n$ has degree $2^{n-2}$ in each variable $X_i$ (its total degree may be less than $n2^{n-2}$).

To use summation polynomials to attack ECOH, we try to find M and M' such that Q=Q', where Q' indicates the prehash obtained in computing the ECOH hash of M'. More generally, for any intermediate value that one might write as symbol s that one might get in the computation of the ECOH hash of M, we write s' for the corresponding symbol in the computation of M'. A collision where Q=±Q' means that $P_0+ \ldots +P_k \pm ((-P_0')+ \ldots (-P_k'))=O$ (1) According Semaev's result, this implies that $f_{k+k'}(x_0, \ldots, x_k, x_0', \ldots, x_{k'}')=0$ (2), because a point −P and P have the same x-coordinate. Therefore an attack strategy is to find M and M' such that (1) holds. A reasonable heuristic is that the y-coordinates used by ECOH vary randomly and independently of the y-coordinates needed in (2). In other words, once equation (2) is satisfied, then we have probability of about $2^{-(k+k')}$ of getting the desired collision in Q+Q'.

This may seem to require that k+k' be made low. However, in fact, the adversary may have a better variant of this strategy, where a low index summation polynomial may be used for much longer messages. The adversary can fix certain blocks of M and M', and only allow a few to vary, say j in total. For example, the adversary could fix M' entirely, and fix all but the first two blocks of M. Furthermore, the adversary could vary $N_0$ and $N_1$ such that $N_0 \oplus N_1$ is some constant value, which means that the checksum point $P_k$ is fixed too. Then (1) may be rewritten as $P_0+P_1+F=O$ (3) where F is some fixed point, and $P_0$ and $P_1$ are unknowns. Using summation polynomials this implies $f_3(x_0, x_1, x)=0$ (4) where x is the x-coordinate of the fixed point F. A solution to (4) should have at least a 12.5% chance of giving a solution to (3) and thereby a collision in ECOH. The equation (4) has degree two in each of the variables $x_0$ and $x_1$, and since x is constant, we may re-write the equation as $g(x_0, x_1)=0$ (5) where now the fixed value x is incorporated into the definition of g.

At this point, we may observe that by definition of ECOH, $x_i=a_i+n_i z$ where z and are field elements of low degree (in the polynomial basis representation, which we now assume). Furthermore, $n_i$ is derived directly from the message, and z is a fixed value, used to shift the message bits to the left inside the x-coordinate. The value $a_i$ includes the index and the counter. We can expect the counter value to be quite low, so the adversary can make reasonable guesses at $b_i$ using low values. Therefore, the adversary can try to solve (5) by solving the following equation $h(n_0, n_1)=0$ (6), where $n_0$ and $n_1$ are low degree field elements, and the polynomial h is derived from g by incorporation of the fixed values z and the guessed values for $b_0$ and $b_1$.

From above, recall that $N_0 \oplus N_1$ was fixed in this version of the attack. Consequently, $n_1$ may be expressed in terms of $n_0$, the constants $N_0 \oplus N_1$ and z, and the guesses $b_0$ and $b_1$. Therefore, we get a single equation $q(n_0)=0$ (7). This equation will be quartic. It will have, therefore, at most four roots. Making a heuristic assumption that the four roots are random field elements, then the probability that they are sufficiently low degree to serve as $n_0$ is negligible. The attacker may choose get around this by varying more of the message, say $n_0$ and $n_1$ and $n_2$. In this case, a two variable polynomial is obtained, and the adversary's task is to find low degree solutions. Such solutions may exist. Semaev notes that finding low degree solutions to multivariate polynomials allows one to find discrete logarithms in elliptic curves more quickly. This suggests that finding low degree roots is difficult, even they exist, because the elliptic curve discrete logarithm appears to remain difficult. Since discrete logs are expected to take $2^{m/2}$ steps to solve, finding low degree solutions to the multivariate polynomials deduced from Semaev summation polynomials, as described above, may also take $2^{n/2}$ steps. Therefore, this attack seems no better than the birthday attack.

In the event that this attack is discovered to require less work than $2^{n/2}$ bit operations, such as if finding sufficiently low degree solutions to polynomials above can be done this efficiently, then this deficiency may be resolved by modifying ECOH by setting $\in \in \{1,2,3\}$ in the generalized ECOH algorithm. In this case, the attack described above does not work because a transformation is applied mixing the message bits and the index bits and the counter bits, so that the resulting x-coordinate cannot so readily be expressed as a predetermined polynomial of a unknown but low degree finite field element.

C. Shifted Collision Attacks.

The recommended parameter $\beta=1$ is intended to provide preimage resistance. Unlike the alternative choice of parameters where $\beta=0$, it introduces the possibility that $Q \neq \pm Q$ but $R=\pm R'$. This would mean that $Q \pm Q'=(v' \pm v)G$ (8), where v and v' are, as noted above, obtained from the x-coordinates of Q and Q'. Ignoring for the moment how one obtains M and M' corresponding to Q and Q', one attack strategy is to find Q and Q' satisfying (8). One strategy to solve (8) is to pick random Q and Q' and to see if the desired equation holds. On the heuristic, the discrete logs and x-coordinate are essentially random and independent of one another, then each guess would have probability of about $2^{-m}$ of success. The attack would therefore take $2^m$ steps, which is much slower than the birthday attack.

D. Truncation Attack.

An attacker may try to find a collision in which $R \neq R'$, but $H=H'$. Such pairs (R, R') do exist, and can be found. Given such a pair, the corresponding message (M, M') needs to be found. One of the messages can be picked first and then the other found with exhaustive search, at cost of about $2^m$ steps. Again this is much worse than the birthday attack.

E. Second Preimage Resistance.

Second preimage resistance is defined relative to some message space with a given probability distribution. A message M is selected from this message space according to the given probability distribution. The adversary then needs to find a second message M' such that M'≠M with the same hash value, that is, $H(M)=H(M')$. Note that it is not required that M' belongs to the same message space. If the hash has second preimage resistance of n bits, then finding this M' should require work of about $2^n$ operations.

F. Exhaustive Search for Second Preimages.

In the exhaustive search algorithm, a message search space is fixed, not necessarily the same space as the one for M. The search space should be larger than $2^n$, such as the set of all bit strings of length 2n. Then random messages M' are selected from the search space until one has $H(M')=H(M)$. Under the heuristic that the hashes of random message space from the search space are nearly uniformly distributed in the hash output space, this algorithm is expect to require about $2^{n-1}$ hash evaluations. This heuristic is generally reasonable, unless the hash fails in some respect to be pseudorandom, and the also the distribution for M is such that the hash of M is among the less likely values of hashes of the values in the search space. In this case, the algorithm above may require more than $2^{n-1}$ hash evaluations.

G. Semaev Summation Polynomial Second Preimages.

Solving Semaev summation polynomials can also be used to obtain second preimages.

The following will discuss security issues related to preimage resistance.

Preimage resistance a hash function refers to difficulty of the problem of taking a random bit string H and finding a message M equals H. To have n bits of preimage resistance, this means that an algorithm that computes preimage with significant probability should take about $2^n$ operations. It would also be true if no preimage finding algorithm has probability of success more than about $2^{-n}$. More generally, if an algorithm requires t bit operations and has probability of success $\in$, then t/$\in$ should be approximately $2^n$.

An n-bit hash function with constant output has n bits of preimage resistance under this definition. Arguably this is counterintuitive, and a good reason to consider an alternative definition of preimage resistance, as will be described below, for which the constant function is not preimage resistant. However, the security of certain digital signature schemes employing hash functions, such as ECDSA, require the definition above of preimage resistance, is very strong reason not to abandon this definition. In this light, the explanation for the counterintuitiveness of the constant function being preimage resistant is that our intuition says it is insecure mainly because it is not collision resistant. In other words, collision resistance and preimage resistance are somewhat independent notions. For example, take any collision resistant hash and construct from it another that remains collision resistant but fails to be preimage resistant. Therefore, these notions are effectively independent, in that neither implies the other. We consider the following two preimage attacks on ECOH.

H. Exhaustive Preimage Search.

Given a bit string H of length n, do the following to attempt to find a preimage. Fix a finite message space, such as all message Choose messages M of some length, such as 4n. Choose a message uniformly at random in the message and compute its hash. If the hash H, stop output M as the preimage. If the hash is not M, repeat until done. Under the heuristic that the hashes of random messages uniformly distributed in the message space are nearly uniformly distributed bit strings of length n, then we can conclude the following: If t is the time the algorithm is allowed to run, and $\in$ is the probability that algorithm finds a preimage, then $t/\in \approx 2n$.

This is a generic algorithm to find preimages in a hash function. Its runtime complexity analysis depends on a heuristic of the randomness of the output of the hash. We conjecture that this heuristic is reasonable for ECOH. More generally, a much milder heuristic gives the same estimate of success. The milder heuristic is that message space is such that for t random messages one expects approximately t different outputs of the hash on these outputs.

J. Inverting ECOH.

Another strategy is to find a preimage of the bit string H of length n is the following. The attack has two stages. The first stage is the following: For each bit string B of length m−n−1 do the following steps: a) Form the bit string X'=B∥H of length m−1; b) Append to X' a single bit to given a bit string X such that X represents the x-coordinate of a point ⟨G⟩; c) For each of two possible points R with x-coordinate represents by X do the following: I) For each point Q in ⟨G⟩ do the following: i) Compute R'=Q+⌊x(Q)/2⌋G. If R'=R, stop and output Q.

Then, second stage is to find M such that the ECOH computation on M yields Q as the intermediate total of elliptic curve points. This could be done by exhaustive, or perhaps by using Semaev summation polynomials. Regardless of the method used in the first stage, under the heuristic assumptions R'=R with probability approximately $2^{-m}$, the first stage would be expected to take about $2^{m-n-1+m-1}$ iterations to find a collision. Because m>n+1, the first stage takes more than $2^n$ operations.

The following will discuss relative preimage resistance. As note above, another type of preimage resistance, which we will call relative preimage resistance is as follows. It is defined with respect a known message space with a probability distribution. The adversary is given the hash of message selected at random form this message space according to the given probability distribution. The adversary then finds some message whose hash equals that of the unknown message. Note that this definition is the same as second preimage resistance except that (a) the adversary is given the hash of first message rather than the first message, and (b) the adversary wins even if it finds the first message. Under the heuristic that the hash function outputs are random, then there exists some easily sampled probability distribution of messages such that images of these messages give rise to every possible bit string in the range of the hash function with approximately equal probability. With respect to these general message spaces, the relative preimage resistance is equivalent to the preimage resistance.

Relative preimage resistance differs from standard preimage resistance primarily for specialized message spaces. Relative preimage resistance can be defined for small message spaces. If a message space has size $2^s$, then an adversary can find, by exhaustive search (see below) a preimage with work of about $2^s$ steps. Therefore, the bits of security defining relative preimage resistance are relative to the message space, and in particular, its size in bits.

K. Exhaustive Search for Preimages.

Given a hash value, one can exhaustively search for messages until one has takes on this hash value, or at least one can do a more limited search and have only some probability of finding a preimage. In an image preimage attack, the adversary searches through messages in the given probability distribution. With one guess the adversary has probability of success $2^{-h}$, where h is the min-entropy of the probability distribution. For repeated guessing, the number of guesses needed to be quite certain to find an inverse depends on the probability distribution, and the way the hash produces collisions on that probability distribution. On the heuristic the hash outputs are random and independent of the inputs, then this attack should require about at most $2^n$ guesses and at least about $2^h$ guesses, especially if h<<n. In a range preimage attack, the adversary chooses some arbitrary messages to search through. On the heuristic that the hash outputs are essentially random, then the probability of success for a single guess is $2^{-n}$, and the number of guesses needed to be quite certain of finding a preimage is about $2^n$. In either case, exhaustive search may be regarded as an attack with n bits of complexity.

M. Single Block Inversion.

This is a specific attack one may try against ECOH. It is a relative preimage attack whose probability distribution has entropy blen bits, which is less than n bits. The aim of the attack of the attack is to be faster than exhaustive search, which one heuristically would expect to take $2^{blen}$ guesses. In this attack all but one block is fixed and known to the adversary. Suppose that $N_j$ is the secret block. The adversary is given the hash H and determines the unknown message block. The adversary loops over all points R in ⟨G⟩ that truncate down to H. This loop has approximately $2^{m-n}$ steps.

If β=0, then the attacker solves a discrete log to get v and thus Q. This has cost of about $2^{m/2}$ elliptic curve group operations. If β=1, then the attacker does an exhaustive search for Q, taking $2^m$ elliptic curve group operations. Then the adversary knows all the term points except $P_j$ and $P_k$. These can be subtracted from Q to obtain $P_j+P_k=(x, y)$. Suppose that ω=0, then $x_k=x_j+\delta$ for some $\delta \in F_{2^m}$ that the attacker knows, because of the way the tail indexed block is computed as checksum. So the attacker needs to solve for $x_j$ in the equation: $(x_j,y_j)+(x_j+\delta,y_k)=(x,y)$ (9). The attacker does not know $y_j$ and $y_k$, but here perhaps Semaev summation polynomials will again be useful. The result is a single variable polynomial equation in xj, which the adversary can easily solve over $F_{2^m}$. Therefore for β=0, the cost of the attack is approximately $2^{m-n+m/2}$, which is larger than exhaustive search $2^{blen}$ provide (3/2)m>n+blen. This is the case for the recommended parameters discussed above.

For β=1, an extra margin of safety is provided.

For ω=1, then the checksum block is an obfuscated function of $x_j$, and the attack does not work. Solving for $x_j$ can be done by exhaustive search.

The following will discuss the issue of pseudorandomness. The output of ECOH is a truncated elliptic curve point. An algorithm to distinguish ECOH output from random bit strings is as follows: Compute all possible values of the x-coordinate that could have been truncated to obtain the ECOH hash; Test each of these for validity of being a point on the elliptic curve; and If the number of valid points is higher than half, then guess that it is an ECOH hash. Therefore, the output of ECOH is distinguishable from a random bit string of the same length, with work proportional to the number of bits truncated, and a mild success rate. This attack can be iterated over many ECOH outputs to obtain a higher success rate.

In many cryptographic applications, such distinguishability is not known to lead to any attacks. Indeed, users of ECOH would not attempt to hide the fact that they are using ECOH. In this attack, the adversary mainly learns the user is using ECOH, information that is public already. Furthermore, there is evidence that using x-coordinates as elliptic curve private keys does not compromised security. Applicant believes that, although this is technically a distinguishing attack, nothing practical can be gained from it. Nonetheless, note that generalized ECOH provides an option α=1, which seems to thwart this attack. This option uses addition modulo $2^m$.

The issue of specialized security properties will now be discussed. Some applications of hash functions require fewer than all the core security properties. Other applications of hash functions require some security properties not among the core properties.

N. Side Channel Resistance.

It seems intrinsic to the design of ECOH that any implementation should inevitably run in time that varies with the message being hashed. Specifically, a counter is incremented until a point on the curve is found. This creates a potential for a side channel, which may be harmful if the message being hashed is a secret, particularly a low-entropy secret. As an implementation-level countermeasure, the implementation can introduces dummy operations to mask the message-dependent variability, or even attempt to make things run usually in the same amount of time, with the rarer exceptions masked by some other means. The blocks can also be processed in randomized order. As a protocol-level countermeasure, one can try to avoid hashing secrets, or at least low-entropy secrets.

O. Denial of Service Resistance.

The design of ECOH is such that an adversary can search for message blocks which require a very higher counter value before finding a block to be computed. If the adversary gets a victim to hash these messages, the adversary can get the victim to a large amount of computation. Finding such message blocks, however, requires the adversary about twice as much work as the victim, so a strong denial of service attack only becomes economical if the attacker can many parties to hash the malicious message. As an implementation-level countermeasure, hashers can set an upper limit on the counters of the messages that they generate for hashing. This has the disadvantage that certain messages would not be hashable. Generators of messages could be advised to tweak their message. As a protocol-level countermeasure, the maximum value of the counter (over all blocks) needed to compute the hash can be sent with the message, or the total of the counters can be sent.

Security Proofs

In this section, so-called "proofs of security" are given. These proofs are not absolute, but rather make certain assumptions. As such, their value depends mainly on the plausibility of the assumptions made.

Core Security Properties

Certain security properties of hash functions are generally expected. This section discusses these properties for ECOH. Some of the security analysis of ECOH relies on a heuristic known as the generic group model. The elliptic curve group in ECOH is modelled by a generic group, whose group operation may only be accessed through an oracle. Of course, an elliptic curve group is not a generic group, because its group operations have explicit formulae. Intuitively, the generic group model addresses only the subset of algorithms that invoke the group operations as prescribed, but otherwise, do nothing specific to the group. More precisely, the generic group model addresses only the subset of attack algorithm on ECOH that are also successful when the elliptic curve group is replaced by a generic group. This subset of algorithms may be called generic group algorithms. The generic group model does not address algorithms that are not generic group algorithms, that is, algorithms specific to a particular elliptic curve group. Results about well-studied problems in elliptic curve cryptography, such as the elliptic curve discrete logarithm problem (ECDLP), serve justify the heuristic generic group model in the following sense. The best known algorithms for solving the elliptic curve discrete logarithm problem, such as Pollard rho, are generic group algorithms. Certainly, for certain special elliptic curves, the best known algorithms for the ECDLP are not generic group algorithms.

Collision Resistance

We give a heuristic argument for the collision resistance of ECOH. We prove that a generic group algorithm for finding a collision in ECOH can only do so in time approximately $\sqrt{n}$, where n is the order of the generic group. More precisely, for a generic group algorithm to find a collision in ECOH, we mean that when the algorithm finds a collision in which the elliptic curve group operations are replaced by a generic group oracle.

Theorem A.1:

Let A be a generic group algorithm that finds a collision in ECOH. Suppose that A makes q queries to the generic group oracle.

Proof:

Suppose that A runs and outputs (M, M') as a possible collision. We use the notation described herein, and add a prime to any intermediate variable to indicate its version in the computation of the hash of M'.

If M=M', then A has failed. Since we are trying to bound the probability of success, we do not consider this case further. So M≠M', and thus N≠N'. This means either: a) $N_i \neq N_i'$ for some i≤K, K', or b) else $N_i = N_i'$ for all i≤K, K' and K≠K'.

These two cases may be referred to as the block and length cases, respectively. In the block case, variable i indicates the index of unequal blocks, unless otherwise noted. In block case, it follows that $O_i \neq O_i'$, that $X_i \neq X_i'$, and that $P_i \neq P_i'$.

Either Q≠±Q' or Q=±Q', which we call late or early collision. Consider an early collision. Either all of the points $P_i$ and $P_i'$ (with i free) are independent, or some are dependent in the generic group oracle session. If all the points are independent, then either in block or length case, then Q=±Q' means that a coincidence has occurred. Dependent points have random representations, and for any given index i, the probability of an dependent having the right form to give a point $P_i$ should be less than $1/\sqrt{n}$.

Otherwise, a late collision has occurred. Then x≠x', due to the elliptic curve being in Weierstrass form. Therefore, u≠u', and v≠v', due to the properties of the elliptic curves used. In other words, the LSB bit of the x-coordinate is redundant. It follows that R≠R', and in particular, in the generic group model, that these points have different combinations. Therefore the probability that they give a collision H=H' is $2^{256}$, where 256 is the length of the hash.

Preimage Resistance

The shifted scalar multiply function in ECOH takes a point Q, maps its x-coordinate to an integer v and returns the point R=Q+vG. We generalize this slightly. Let E be the elliptic curve group in question. A function f: E→Z is called a conversion function. We will be mostly interested in the conversion function used by ECOH which maps Q to v above. Given a conversion function f, we can define function φ: E×E→E by φ(S,Q)=Q+f(Q)S (10). We may also write φs(Q). This function is the generalized shifted scalar multiply. We formulate the following problem.

Problem A.1:

Given S and φs(Q), find Q. We call this problem the shifted log problem. We conjecture as follows.

Conjecture A.1:

If the conversion function f is almost injective, then solving the shifted log problem cost about N, the order of G, group elliptic curve group operations. Compared to the discrete log problem, which takes about $\sqrt{N}$ to solve, this problem is conjectured to be considerably harder. An immediate objection to this conjecture is that the shifted log problem may in fact be easier than the discrete log problem, requiring much fewer than $\sqrt{N}$ group operations. However, it may be observed that an algorithm to solve the shifted log problem could be used to forge an ECDSA signature.

Theorem A.2:

Let f be the conversion function used in ECDSA to determine the r component of the signature from an elliptic curve point. Let A be an algorithm that solves the associated shifted log problem where f. Then an algorithm F can be built that calls A once can be used to forge an ECDSA signature. The forger is efficient as A plus a very small extra cost.

Proof:

Algorithm F is given a message M and public key P with respect to which to forge a signature. Algorithm F has access to a subroutine A such that A(T, S) inverts $\phi S$ on T. In other words, such that T=A(T, S)+f(A(T, S))S (11). Algorithm F will now be described.

Algorithm F computes e=H(M) where H is the hash used in ECDSA, including the step of conversion to an integer. Recall that a pair of integers (r, s) is a valid signature for message M and public key P if and only if: r=f((e/s)G+(r/s)P) (12) where the divisions above are done modulo N. Observing that (12) holds if R=(e/s)G+(f(R)/s)P (13) and r=f(R), the following strategy can be used for F. Now F chooses random s and computes S=−(1/s)P and T=(e/s)G. Then F calls A to compute r=f(A(T, S)) (14) and output (r, s) as an ECDSA signature.

To see that this a valid signature, write R=A(T, S). Then according to equation (11), (e/s)G=R−(f(R)/s)P (15), which clearly implies (13).

Therefore, the shifted log problem associated the ECDSA conversion function is at least as hard as being able to forge an ECDSA signature on any message given only the public key. Assuming the security of ECDSA, this only assures that shifted log problem is about as hard as $\sqrt{N}$ elliptic curve group operations. We give a heuristic argument in the generic group model suggesting that the shifted log problem takes about N group operations, not just $\sqrt{N}$ group operations. We assume that f is almost bijective.

Theorem A.3:

An algorithm A working in the generic group that finds a point that is the shifted log of the first two independent points, that makes q queries has a probability of success of approximately q=N.

Proof:

The desired result is T=R+f(R)S, where T and S are first two independent points in the generic group session. If R is also independent in the session, with public representation chosen by A, then its private value will be randomly by the generic group oracle, and the probability of the desired is exactly 1=N, the probability that R=T−f(R)S holds in the private space. If R is a dependent point in the generic group session, then its private value is determined by the generic group oracle before its public representation is chosen by the generic group oracle. Because f is almost invertible, and the representation of R is chosen uniformly at random, the distribution of f(R) is almost uniformly at random. The probability of the desired result is therefore only a little more than 1=N, depending on the degree of departure of f from being bijective.

Now suppose that adversary B could find preimages in ECOH. More specifically, assume that B could solve the range preimage problem. Then clearly B can be used to solve the shifted log problem.

Pseudorandomness

Under the heuristic of the generic group model, pseudorandomness is essentially free. The basic level of pseudorandomness, for an un-keyed function, means that given a random input message, the output is random. More precisely, for a secret random message, an adversary cannot distinguish the output from a uniformly random bit string. However, ECOH is not implemented with a generic group, but rather with an actual elliptic curve group.

Generic Group Model

In the generic group model, a group is modelled by an oracle which is the only way to calculations in the group. Any algorithm, including an adversary, which succeeds in the generic group model, is called a generic group algorithm.

We begin by defining the generic group oracle. Then we define some concepts about situations that can occur during interaction with the group oracle. Then we prove some lemmas and theorems about these situations.

The Generic Group Oracle

The oracle maintains two lists, one public and one secret. After q queries to the oracle have occurred, these lists are: a list of points, $(P_1, \ldots, P_q)$, which is public; and a list of integers $(d_1, \ldots, d_q)$, which is secret.

The lists are thus initially empty. The integer $d_i$ ranges from 0 to n−1, and may be thought of as the discrete logarithm of $P_i$. The oracle allows two types of queries to the oracle. Consider the query q. Before this query, there are two lists of q−1 entries, so the point list $(P_1, \ldots, P_{q-1})$.

Table 4 listed below explains how the generic group oracle receives query q and updates its two lists.

TABLE 4

Push and Subtract Commands for a Generic Group Oracle

Push (This command has input $P_q$.) The oracle appends $P_q$ to the public list of points. If $P_q = P_i$ for some i < q, then the oracle sets $d_q = d_i$. Otherwise, the oracle chooses a random integer $d_q$ uniformly random in range [0, n − 1] distinct from all $d_i$ with i < q. The oracle appends $d_q$ to the private list of integers.
Subtract (This command has no input, but requires q > 3.) The oracle computes $d_q = d_{q-1} - d_{q-2}$ mod n, and appends $d_q$ to the private list of integers. If $d_q = d_i$ for some i < q, then the oracle sets $P_q = P_i$. Otherwise, the oracle selects a new point $P_q$ uniformly at random and distinct from all previous points, that is, $P_q \neq P_i$ for all i < q. The oracle appends $P_q$ to the public list of points.

It may be noted that the subtract command can be used to compute the identity element of the group, the one whose associated integer is zero. Push $P_q$ again to force $P_{q+1}=P_q$ and then issue a subtract command to get $P_{q+w}=P_{q+1}-P_q$, which forces $d_{q+2}=d_{q+1}-d_q=0$. Once the identity element has been obtained, the negation of any given point P can be obtained, by pushing the identity element, say O and then issuing a subtract command. Addition of points P and Q may be obtained by obtaining the negation of Q, say R, pushing P and R then subtracting. Scalar multiplication may be achieved by repeated addition.

Variants of the generic group model exist. Shoup proposed a model in which in terms of this model only allows two push commands. In the case of elliptic curve groups, this limitation seems unrealistic since it quite possible to generate fairly arbitrary elliptic curve points. In particular, execution of ECOH, if translated in the generic group model setting, requires about as many push commands as subtract commands. Therefore, it is important not to limit the push commands.

Nechaev, and later Maurer, considered variants of the generic group model in which there no actual representations of the group elements upon which to act. Instead, groups elements are marked by incrementing indices in order of occurrence. This model is more limited in the sense that algorithms such as Pollard rho, which makes some pseudorandom decisions based on the representations of the elements, do not seem to generic in this model. Shank's baby-step-giant-step algorithm is generic in this more limited model. Floyd's cycling method, allows Pollard rho use much less memory than Shank's baby-step-giant-step, so this seems to be concern.

Other variations of the generic group model include:

a) The oracle can provide commands such as scalar multiplication. These commands may seem to let a generic group algorithm more quickly, although this may not really be the case. Regardless, for elliptic curve groups, scalar multiplication is usually achieved by repeating the basic group operations, so allowing these more powerful commands does not seem realistic.

b) Points may have a multiple representation, with the oracle providing an extra command for testing equality of different representations. Elliptic curve points, represented in affine coordinates, do not have multiple representations, so it seems reasonable to not bother with this complication of the model.

c) The oracle may restrict the representations of point to have the form $(P_i, s_i)$ where $s_i \in \{0,1\}$ is a sign bit, meaning $-(P_i, s_i) = (P_i, 1-s_i)$, but otherwise choose $P_i$ randomly. This variant attempt to account for the fact that in elliptic curve groups of Weierstrass form, the negative of a point shares the same x-coordinate.

Generic Group Session Attributes

An independent point is new point pushed to the oracle. We write for the query index of the $j^{th}$ independent point. While it is always true that $i_1=1$, it is not necessarily true that $i_j=j$ for $j \geq 2$, unless the first j queries are push commands with distinct inputs. For convenience, we sometimes write $Q_j = P_{i_j}$ and $e_j = d_{i_j}$.

Point $P_i$ in the list of the public points may be assigned a combination $C_i$. A combination is an infinite sequence of integers. Combination may be regarded as vectors, and in particular, they may be added and subtracted, using element-wise addition and subtraction. Write $E_j = (0, \ldots, 0, 1, 0, \ldots)$ for the combination that has a 1 in position j and is zero everywhere else. The combination list is $(C_1, \ldots, C_q)$. Table 5 outlined below prescribes how the combinations are computed. The combination list may be regarded as a supplementary public list, because it can be derived from the public list of points $(P_1, \ldots, P_q)$ and the knowledge of whether each query is a push or a subtract command. We define a combination $e = (e_1, e_2, \ldots)$, where as above, $e_j = d_{i_j}$ where defined, and $e_j = 0$ elsewhere, then $d_i = C_i \cdot e$, which is the dot product. More generally, we can similarly form a combination d from $(d_1, d_2, \ldots)$, and regard this is a vector. We can assemble the combination vectors $C_i$ into a matrix C and write d=Ce. We call e the essential secret, or just the essential. We also write $P = (P_1, \ldots, P_q)$ as a further shorthand.

TABLE 5

Combination List

Push If $P_q = P_i$ for some $i < q$, then set $C_q = C_i$.
Otherwise, $P_q$ is independent. If $P_q$ is the jth independent point, that is, $q = i_j$ and $P_q = P_{d_j} Q_j$, then set $C_q = E_j$
Subtract Set $C_q = C_{q-1} - C_{q-2}$ Only certain essential vectors e are consistent with a given (P, C). These are the vectors e such that the vector d=Ce satisfies $d_i = d_j$ if and only if $P_i = P_j$. We call the set of such essentials, the consistent essentials, and we write the set as E, or $E_q$ when we wish to be more specific by indicating the query index, in this case as a subscript. The density ∈ of set of the consist essentials E is that probability that random essential is consistent. More precisely, $\in_q$, the density of $E_q$, is defined as $|E_q|/n^j$ if j is the number of independent points up to including $P_q$.

Definition B.1:

A coincidence has occurred at query q if for some $i<q$, $P_i = P_q$, but $C_i \neq C_q$. If no coincidence has occurred for any $i \leq q$, then the session up to q is coincidence-free.

Technical Results

We begin with a lemma that is rather intuitive, but is useful for technical reasons. Although a generic group algorithm can eliminate some essentials as inconsistent, it cannot cause learn any information about which the consistent essential is more likely than any other, because they are all equally likely.

Lemma B.1:

However an algorithm A interacts with a generic group model, each consistent essential is equally likely.

Proof:

We use induction on the number of queries. For q=1, the result is clear. Now suppose the $e \in \in_{q-1}$ are all equiprobable. We wish to show that the $e \in \in_q$ are equiprobable. We have three cases based on whether query q is a push of an old point, push of a new point, or a subtract. First, a push of a previous point does not change e or ∈, that is, $\in_q = \in_{q-1}$, and by induction, all ∈ are equiprobable in $\in_{q-1}$, so they are equiprobable in $\in_q$. Second, a push of new point, extends ∈ by a new entry, say $\in_j = d_{i_j}$, where $i_j = q$ and j is the number of independent points among the first q queries. In this case, $\delta_q = \delta_{q-1} \times (\{0, 1, 2, \ldots, n-1\}/\{d_1, \ldots, d_{q-1}\})$, which both entries of the Cartesian product of sets having their elements equiprobably distributed. (For $\in_{q-1}$, this is by induction, for the second factor, this by definition of the generic group oracle push command.) Cartesian products of equiprobable distributions are equiprobable. Therefore $e \in \in_q$ are equiprobable. Third, a subtract command restricts the set of consistent essentials, that is, $\in_q \subset \in_{q-1}$. Restriction of equiprobable distribution results in another equiprobable distribution. By induction, $\in_{q-1}$ is euiprobable, therefore $\in_q$ is equiprobable.

In all three cases, $e \in \in_q$ is equiprobable if $e \in \in_{q-1}$ is, so by induction the consistent essentials are equiprobable.

The next lemma establishes that a coincidence-free session has a high density. In other words, assuming that no coincidences occurred, so that that there is one-to-one correspondence between the points and their combinations, nearly all essential secrets are consistent with the session. In information theoretic terms, if no coincidence occur, the information a generic group algorithm learns about the essential secret is small.

Lemma B.2:

In coincidence-free session of q queries, of which s are subtract commands and p are push commands, the density of $\in_q$ satisfies the lower bound essentials:

$$\varepsilon_q \geq 1 - \frac{\binom{q}{2}}{n}. \tag{16}$$

Proof:

To prove the lower bound, use induction on q. For the based of induction take $q = 1$. But $\binom{1}{2} = 0$, so the lower bound is 1. But, $\in_1$ is by definition 1, so the bound is met, with equality. For q>2, by induction, assume equation (16) with q replaced by q−1. There are three cases to consider depending whether query q is a push of an old point, a push of a new point, or a subtract command.

First, in a push of an old point, the effect is that $\in_q = \in_{q-1}$, and the number of j independent points does not change. Therefore $\in_q = \in_{q-1}$. By induction $$\varepsilon_{q-1} \geq 1 - \binom{q-1}{2} / n.$$

Therefore, $$\varepsilon_q \geq 1 - \frac{\binom{q-1}{2}}{n} > 1 - \frac{\binom{q}{2}}{n}, \quad (17)$$

and therefore $\in_q$ is actually strictly above the required bound.

Second, in a push of an new point, the effect is that $\in_q = \in_{q-1} \times (\{0, 1, 2, \ldots, n-1\}/\{d_1, \ldots, d_{q-1}\})$, and the number of independent points increases by one, say from j−1 to j. Therefore $\in_q = \in_{q-1}(1-\delta/n)$, where $\delta = |\{d_1, \ldots, d_{q-1}\}|$ (18). Clearly $\delta \leq q-1$, so, by induction:

$$\varepsilon_q \geq \left(1 - \frac{\binom{q-1}{2}}{n}\right)\left(1 - \frac{q-1}{n}\right) = 1 - \frac{\binom{q}{2}}{n} + \frac{(q-1)\binom{q-1}{2}}{n^2}, \quad (19)$$

which strictly exceeds the desired bound.

Third, in a subtract command, the set E and the density generally shrink. An exception is if $C_q = C_i$ for some i<q, which is really a wasteful query for generic group algorithm to make, then $\in_q = \in_{q-1}$ and the density remains the same. As above $\in_q = \in_{q-1}$ and it follows that $\in_q$ exceeds the desired lower bound. If $C_q \neq C_i$ for all i, and no coincidence occurs at q, then all $e \in \in_{q-1}$ can eliminated such that $C_q^e = C_i^e$, because these would create a collision at q. Let j be the number of independent points. For each i, there are at most $n^{j-1}$ solutions e to the equation $C_q^e = C_i^e$, because this may be regarded as a one nontrivial linear equation, $(C_q - C_i)e = 0$ over a vector space of dimension j over the field $F_n$. The total number of essential vectors from $\in_{q-1}$ that are thereby excluded from $\in_q$ is therefore at most $(q-1)n^{j-1}$. Indeed, fewer vectors will be excluded. The impact on the density is that $\in_q \geq \in_{q-1}(1-(q-1)/n)$, which as seen above, implies that $$\varepsilon_{q-1} \geq 1 - \binom{n}{2}/n$$

by induction.

In all three cases, $\in_q$ exceeds the claimed lower bound. Note that generally $\in_q$ will often far exceed the stated lower bound. For example, if the generic group algorithms makes q=n push commands of new points, the lower bound above is negative, where it is easy to see that $\in_n = n!/n^n$. Together, the previous two lemmas buy us the fact that if no coincidences have occurred, and q is sufficiently small, that a generic group algorithm learns very little information about the essential secret. In other words, to have a good chance at guessing a discrete logarithms of one independent point to another point, with only a few queries, the adversary would need to force a coincidence. The previous two lemmas, though, do not say whether an adversary can force a coincidence quickly. The main result is that a coincidence cannot be forced too quickly.

Theorem B.1: If an algorithm A interacts with a generic group oracle of prime order n, making q queries, of which s are subtract commands and p are push commands, then the probability $\pi_q$ that a coincidence has occurred at q or earlier satisfies the following upper bound:

$$\pi_q \leq \frac{\binom{q}{2}}{n}. \quad (20)$$

Proof:

For the upper bound, use induction on q. As the base of induction, take q=1. A subtract command requires q≥2, so a subtract is not allowed in the base case q=1. So, s=0, and thus the upper bound is zero. With one point on the list, however, there is only one combination, so there can be no coincidence. The probability of a coincidence is zero. So the upper bound is met. Now suppose that q≥2. The final query is either a push or a subtract. If it is a push, then it is either a push of old point, or a push of a new point. Consider these three cases separately below.

First, suppose that query q is a push of an old point. In this case, if there is a coincidence among the q queries, then there was also a coincidence among the first q−1 queries, because if the coincidence involves the final point, the final point can be replaced by an earlier point, to give another coincidence. By induction the probability of there having been a coincidence among the first q−1 points was at most $$\frac{1}{n}\left(\binom{1-q}{2}\right),$$

which is lower than the desired upper bound.

Second, suppose that query q is a push of a new point. In this case, if there is coincidence among the q queries, there is a coincidence among the first q−1 queries, because the coincidence cannot involve the final point, since it is distinct from the all the previous points. Again, by induction, the probability of there having been a coincidence among the first q−1 points was at most $$\frac{1}{n}\left(\binom{1-q}{2}\right),$$

which is lower than the desired upper bound.

Third, suppose that query q is a subtract command. Then $1-\pi_q = (1-\pi_{q-1})(1-\kappa_q)$ (21) where $\pi_{q-1}$ is the probability of there having been a coincidence at some query index i<q, and $\kappa_q$ is the following conditional probability: the probability of a coincidence at query index q given that session is coincidence free up to query index q−1. Consider occurrence of the event whose $\kappa_q$ probability measures. If $C_q = C_i$ for some i<q, then there can be no coincidence at q, as otherwise there would have been at coincidence before q, which is a contradiction. Therefore $C_q \neq C_i$ for all i<q. Again, $\kappa_q$ is the probability that $e \in \in_{q-1}$, satisfies $(C_q-C_i)e=0$ for some i. The upper bound $$\kappa_q \leq \frac{q-1}{n} \varepsilon_{q-1}^{-1} \qquad (22)$$

may be proved as follows. For unrestricted e and fixed i<q, the probability that $(C_q-C_i)e=0$ is exactly 1/n, because $C_q-C_i$ is a nonzero vector defined over the field $F_n$. For unrestricted e, then the probability that $(C_q-C_e)e=0$ for some i<q is at most q−1 times the probability of fixed i, so it is at most q−1/n. By Lemma B.1, e is equiprobably distributed $\in_{q-1}$. This restriction from all e to $\in_{q-1}$ can increase the probability of the event $(C_q-C_i)e=0$ for some i, but only by at most the amount given in (22). By Lemma B.2, this gives a bound $$\kappa_q \leq \frac{q-1}{n}\left(1 - \frac{\binom{q-1}{2}}{n}\right)^{-1}. \qquad (23)$$

Therefore, converting the upper bounds on $\pi_{q-1}$ assumed by inductive hypothesis, and the upper bound on $\kappa_q$ (23) into lower bounds on $1-\pi_{q-1}$ and $1-\kappa_q$, respectively, and substituting into (21), we get $$(1-\pi_q) \geq \left(1 - \frac{\binom{q-1}{2}}{n}\right)\left(1 - \frac{q-1}{n}\left(1 - \frac{\binom{q-1}{2}}{n}\right)^{-1}\right) = \qquad (24)$$

$$1 - \frac{\binom{q-1}{2}}{n} - \frac{q-1}{n} = 1 - \frac{\binom{q}{2}}{n},$$

which translates into the desired upper bound on $\pi_q$.

In all three case, the upper bound on $\pi_q$ was proven assuming the induction hypothesis. Note that this result could probably be improved. For example, generic group algorithm makes no subtract commands, the probability of a coincidence is zero, so a better lower bound may be possible if the lower bound incorporates number of subtract commands. A bound such as $$\pi_q \leq \frac{\binom{s}{2} + ps}{n} = \frac{\binom{q}{2} - \binom{p}{2}}{n} \qquad (25)$$

seems plausible, where s is the number of subtract commands and p is the number of push commands.

Application to Cofactor Two Binary Polynomial Basis Weierstrass Curves

ECOH makes use of elliptic curves defined over a field $F_{2^m}$ where m is prime. Elements in the fields are represented using polynomial basis. The elliptic curves have equations in short Weierstrass form $y^2+xy=x^3+ax^2+b$. The elliptic curves have cofactor two, meaning that they order 2n where n is prime. We will model the subgroup of order n of the elliptic curve group as a generic group of order n. More precisely, we model a certain compressed form of points as generic group operations. This compressed form maps the y-coordinate to a single bit, and drops the least significant bit LSB (as a polynomial, that is, the constant term) of the x-coordinate. The reason for dropping the LSB of the x-coordinate, is that it be computed in the terms of the other bits of the x-coordinate, at least when the point has order n. For example, in the curve B-409, this bit has a constant value for points of order n (and takes the other value for points of order 2n).

Theorem B.2:

A generic group algorithm that makes $q<\sqrt{n}$ queries has probability of at most about ½ of causing a coincidence to occur. For a generic group algorithm to force a coincidence, with only negligible probability of failure, the number of queries required is at least $q \approx \sqrt{2n}$.

Proof:

Plug the q values into Theorem B.1.

Customized Generic Group Model

In this section, a customized generic group model is considered, which better reflects the facts that the actual groups used in ECOH have representation such that a point and its negative share an x-coordinate (and only differ in a single bit when the representation is compressed). In ECOH, the elliptic curves are defined using a short Weierstrass equation, over a field of characteristic two with prime degree using a trinomial or pentanomial basis. Furthermore, the curve has cofactor two. The group that we wish to model is index two subgroup of the elliptic group. The specific representation of points in this group that we wish to model uses a variant of generic group model is the following compressed representation.

In a first aspect of this compressed representation, the y-coordinate is represented by a single bit. This can be done, because there are only two possible y-coordinates per x-coordinate. Furthermore, it is known how to compress the choice of which of these two possible values down to a single bit, in a canonical and reversible manner.

The second aspect of compressed representation that we wish to model is dropping the least significant bit of the x-coordinate. It turns out that in the curves B-283, B-409 and B-571, when the point belongs to the index two subgroup (the large prime order subgroup), a subset of bits of the x-coordinate sum, modulo two, to a constant. They are linearly related. The set of bits always includes the least significant bit, so this bit can be determined from the others. In the case, B-409, the set of these critical bits consists of the least significant bit only, so the least significant bit is constant. By dropping this bit, the remaining bits do not seem constrained by any simple linear relation.

In fact, the only constraint on the remaining bits is given by the curve equation itself. When modelling the elliptic curve group as a generic group, we will make the heuristic assumption that this relation results in an effectively random relation between the bits.

Encrypted Elliptic Curve Hash (EECH)

Another alternative to the MuHash will now be described, which also removes the reliance on a pre-existing hash by, in this embodiment, replacing the pre-existing hash with a block cipher under a fixed key.

As discussed above, the MuHASH construction of Bellare and Micciancio provides a hash function that is provably collision resistant under plausible assumptions. That is to say, Bellare and Micciancio identified a set of conditions sufficient to make MuHASH collision resistant. In this light, MuHASH provides excellent security.

However, MuHASH uses a pre-existing hash function operating over a fixed length. This pre-existing hash function should be both collision resistant and one-way in order for MuHASH to be collision-resistant and one way, respectively. In other words, a necessary condition for MuHASH to be a secure hash is that some pre-existing hash is secure. In this light, MuHASH provides mostly a way to extend the domain of an already secure hash. In particular, it does not produce collision resistance from scratch.

It would be desirable to modify MuHASH in such a way to reduce the reliance upon some pre-existing secure hash. More formally, it is beneficial to weaken the set of assumptions necessary for security without significantly strengthening the set of assumptions sufficient for security. More generally, the following describes a collision resistant function from scratch. The following alternative embodiment of the EC hash function 22 provides a modification of the MuHASH, referred to herein as the Encrypted Elliptic Curve Hash (EECH). A difference with respect to MuHASH is the use a secure block cipher, with a fixed non-secret key, instead of a pre-existing hash function. Because a block cipher has no collisions, EECH does not directly rely on some conjectured collision resistance of a pre-existing hash function. Therefore, in EECH, the set of conditions necessary for collision resistance can be weakened.

The proof in the random oracle model of collision resistance of MuHASH is adapted herein to work for EECH by using the ideal cipher model instead of the ideal hash (random oracle) model. A position is taken that this change does not substantially strengthen the set of assumptions sufficient for the collision resistance. However, it is noted that the use of a block cipher in EECH requires consideration of preimage attacks (single block only). To address this, various enhancements of EECH are proposed by introducing a further stage of processing. This is address without relying on some pre-existing preimage (or collision) resistance assumption.

As a logical test for this conjecture, a simplification of EECH is also proposed, where the block cipher is replaced by the identity function, which corresponds to the ECOH embodiment discussed in detail above.

Encrypted Elliptic Curve Hash

Figure 5:
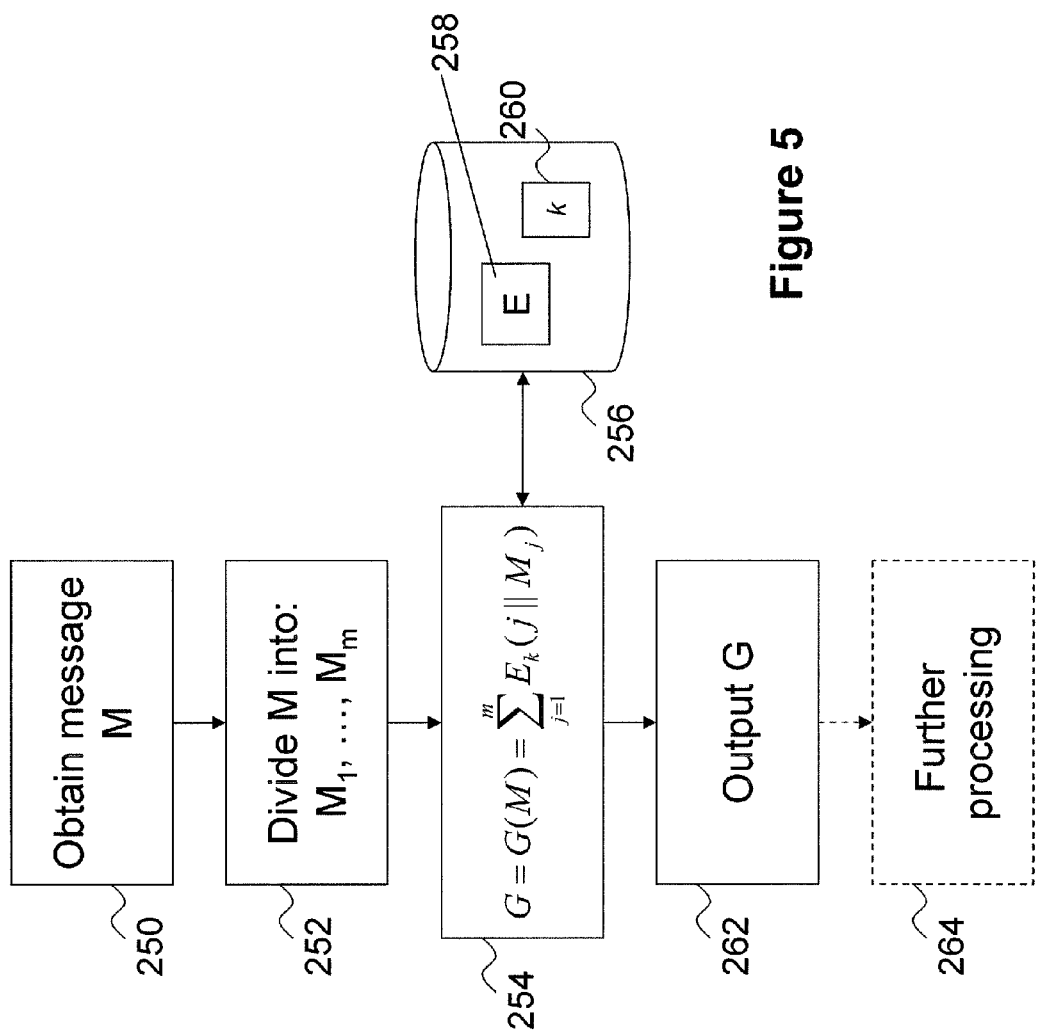
FIG. 5 is a flow chart illustrating operations performed in another embodiment of the hash function shown in FIG. 1.

Turning now to FIG. 5, various operations in performing EECH are shown. Similar to ECOH, step 250 involves obtaining a message M. At 252, the message M is divided into blocks $M_1, \ldots, M_m$, where the last block $M_m$ is reserved to encode the length of M, and furthermore has formatting distinguishable from any other block. The pre-hash is computed as $$G = G(M) - \sum_{j=1}^{m} E_k(j \| M_j),$$

where $E_k$ is a secure block cipher E 258, which may be stored in a memory 256 and accessed by the hash function 22, and uses a fixed and non-secret key k 260. In some embodiments, the terms being operated on by the block cipher 258 may be in the form $E_k(c\|j\|M_j)$ where c is the minimal value of counter that ensures the output represents a valid element in some abelian group G, whose operation is indicated using addition (whereas MuHASH uses multiplicative notation). It may be assumed throughout the following discussion that that $|G|=n$ is prime and that G is the subgroup of an elliptic curve group defined over a finite field.

It may be noted that, like MuHASH, this function is incremental. Suppose that message M' is identical to M except in block j, where it has value $M_j'$ instead of $M_j$. A value G(M') can be computed knowing only G(M), $M_j$ and $M_j'$ as G(M')

Figure 6:
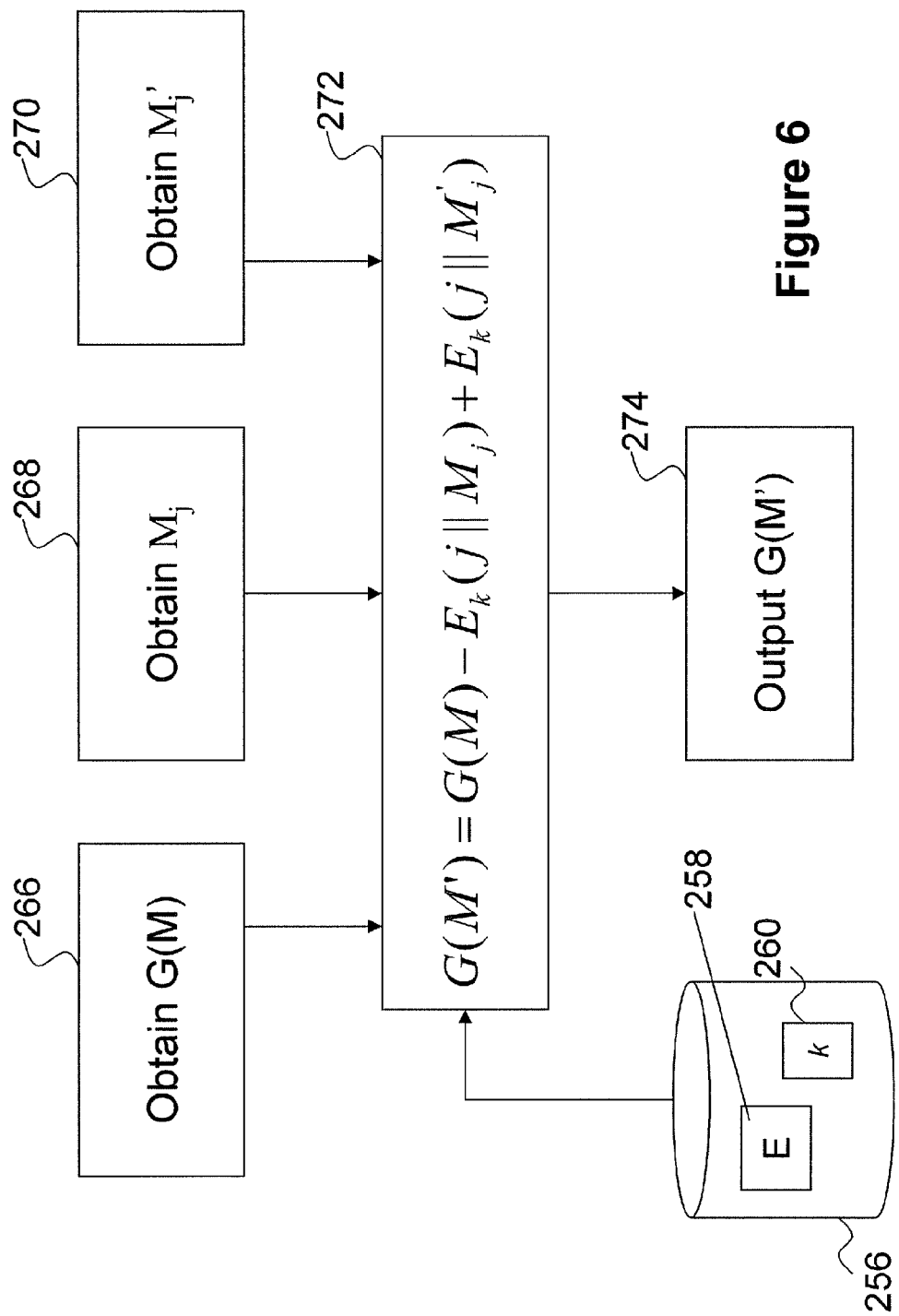
FIG. 6 is a flow chart illustrating an incrementation operation for the embodiment shown in FIG. 5.

$=G(M)-E_k(j\|M_j)+E_k(j\|M_j')$, which is shown in FIG. 6. As can be seen in FIG. 6, G(M) may be obtained by the hash function 22 (or a separate incremental hash function—not shown) at 266, $M_j$ obtained at 268, and $M_j'$ obtained at 270. These values may then be used to compute G(M') per the above at 272 and then output at 274. For long messages, this will be considerably faster than computing G(M') using the full summation for G.

It can also be noted that EECH and MuHASH are δ-incremental, because, not only is the operation for G(M') faster than the operation for G=G(M), it only requires the knowledge of the changes (the δ). Therefore, its cost does not depend on the length of the M nor does it require full knowledge of M. A special case of incrementality is modification of the final blocks, including deletion of the final blocks, or addition of new blocks. Iterative hash functions, such as SHA-1 and SHA-256, are not generally incremental, but they often allow efficient addition of new blocks (but the length-encoding cannot be removed, so the extended messages will have peculiar message encodings embedded within them). One can also consider a more general kind of incrementality that allows for more than just in-place changes. For example, updating the hash after insertions and deletions of block into the middle of message.

Although δ-incrementality can be viewed as a positive attribute, one can also view it negatively, and re-name it malleability. For example, because of the extension properties of SHA-1, one could not define a MAC by prepending a message with a secret key and applying SHA-1, because then an attacker could produce the MAC of any extension. Similarly, if a MAC were to be built from EECH by inserting a secret key into the message, the δ-incrementality would allows an attack to forge a MAC of the modification of the message. It is therefore not recommended to construct a MAC in this way. Another way of constructing a MAC from EECH would be to make the block cipher key k secret.

Fitting into the Group

For an elliptic curve group over a finite field F, approximately half of the field elements f are equal to the x-coordinate of a point P on the elliptic curve over the field. With the approach described earlier, of finding the minimal value of an unsigned integer counter c such that $E_k(c\|j\|M_j)$ encodes a valid x-coordinate, the expected average value of c is 1, with value 0 occurring half the time. Occasionally, c will be need to higher, and it is arguably costly to do so many encryptions and elliptic curve validity testing. Probably more problematic is that if only u bits are allotted for the c, then there is probability $2^{-u}$ that no encryption corresponds to a valid x-coordinate. This may require u to be fairly large, to avoid failure to evaluate the hash. If resistance to a mischievous denial-of-service attack, u should be chosen even larger to make it infeasible for an adversary from search for a message block $M_j$ which will never encrypt to a valid x-coordinate.

Rather than choosing large u, u could be kept small, except that when no values of c that lead to a valid encryption are found, $M_j$ can be subdivided into two sub-blocks and an attempt to encrypt each of the blocks separately can be performed.

Another strategy is to use quadratic twists of curves. Generally, if a value x∈F is such that x is not valid for the elliptic curve, then it is valid for the twist of an elliptic curve. Therefore, one could add the valid points on the main elliptic curve, and add the invalid points on the twist of the elliptic curve. This gives two points. One could either concatenate these two points, or more in the spirit of EECH, and add them, as follows. To add a point on the curve to a point on the twist, the point on the twist is mapped into an point on the main curve extended to a quadratic extension of the field F. In either case, concatenation or using a quadratic extension, the result is twice as long. It should be noted here, that the y-coordinate has not been mentioned. There is negligible chance that the output of an encryption operation will encode both an x-coordinate and a y-coordinate. Therefore, the process can aim for the x-coordinate, and for example one bit of the y-coordinate. Then, standard methods of point decompression can be used to recover the y-coordinate, which may be needed in order to do the point additions.

It may be noted that this point decompression involves solving a quadratic equation, which can be a costly operation compared to an encryption or a elliptic curve point addition. For curves defined over characteristic two fields, the quadratic equations can be solved using the half-trace function, which is linear. With the use of look-up tables and linearity, it may be possible to make this cost relatively small. Decompression over a binary field also requires the computation of an inverse, which can also be somewhat costly. However, the cost inversions can be amortized by batching them together.

Various implementations of the further processing step 264 shown in FIG. 5 will now be described.

Minimalism

To make EECH preimage resistant, one embodiment is to apply a one-way function, such as a hash function. In doing so, however, it is desired not to introduce some necessary conditions, specifically collision resistance and preimage resistance of the applied hash function. It is desirable to be a minimalist in modifying the above definition of EECH, with this taking the three tenets: (a) no new necessities, (b) translation of collisions, (c) cipherless security. These tenets are explained further below.

First, consider the hash function derived from EECH defined as follows $H=F_k(G)=G \oplus E_k(G)$ (26). Although the function $F_k$ is likely be an excellent choice of a preimage and collision resistant function, along with having good pseudo-randomness properties, it does not meet any of the above three minimalist tenets.

If $F_k$ is not preimage resistant, then given H, an adversary has a good chance of finding G (because $F_k$ is almost one-to-one). As stated earlier, G has the property if an adversary knows all but one block of the message, then the adversary can find the missing block given G. Therefore H has the same property. As such, for H to have full preimage resistance, it is the case that $F_k$ is preimage resistant. In other words, (26) adds a new necessity: preimage resistance of $F_k$, failing to meet the first of the three tenets. Arguably, however, the preimage resistance is fairly well-accepted assumption, so it is not really new. The subjective perspective that the security EECH is based on the security of an elliptic curve group may be taken, so that this necessity is new with respect to the design rationale for EECH in that it does not depend on the elliptic curve group.

Suppose that one can find collisions in the function H defined by (26). It is not clear how one translates this into collisions in the function of G (which is EECH). Therefore, H also fails to meet the second of the three tenets. Perhaps in the ideal cipher model, one can make such a translation, but it is not desirable to invoke a non-standard model, or any strong assumption, to tie the collision resistance of the hash H to the pre-hash G.

One way to be sure that the hash is designed in such a way that the hash does not fundamentally rely on randomness, or some other property of the block cipher $E_k$, is that there should not be an attack on the hash when $E_k$ is substituted by the identity function. With (26), if $E_k$ is the identity function, then H≡0, which is a function that has no collision resistance whatsoever. If $\oplus$ is replaced in (26) with the group operation, then we get H=2G, which suffers from the same preimage attacks as G. Therefore the design of H from (26) fails to meet the third of the three tenets.

It is also desirable to find preimage resistant enhancements of EECH that can be shown to meet all or most of the three minimalist tenets.

Logarithmic EECH (LEECH)

The first enhancement of EECH, may be referred to as Logarithmic, (and abbreviated as LEECH), under the idea that the preimage resistance derives from the difficulty of the discrete logarithm problem. H=[G]P, where P∈G is some fixed group element (in G, or possibly some other secure additive group), and [G] is integer derived from G.

A disadvantage of LEECH is that it is no longer incremental. This disadvantage can be overcome by retaining a copy of G (which is incremental) in a safe place for those authorized to increment. For example, if one wishes to digitally sign the contents of a disk drive, then it can be assumed that an adversary has access to the message signed, so storing G on the disk should not cause any security problems. For an encrypted disk drive, it can be appreciated that G should also be encrypted.

Repeated Enhancement of EECH (REECH)

A faster enhancement, but still a non-incremental one, is: $H=E_k(m+1\|G_-)+E_k(m+2\|G_+)$, where $G_-$ contains the left half of the bits of G, and $G_+$, the right half. This hash function may be referred to as Repeated enhancement (REECH), because H an be viewed as EECH applied to G. As with LEECH, a disadvantage of REECH is that it is not incremental, but this can often be overcome with the same technique of storing the EECH pre-hash G along the with message. Clearly, REECH is faster to evaluate than LEECH, but as the message length increases, the difference in speed does not. For long messages, the relative difference is small.

Pairing Enhancement of EECH (PEECH)

Rather than trying to speed up LEECH, as can be done with REECH, an attempt to preserver δ-incrementality can be attempted. To do this, H can be derived from G using an homomorphic one-way function F, because then H'=F(G')=F(G+D)=F(G)+F(D)=H+F(D), where D is the difference needed to update G(M) to G'(M) in EECH. One such function uses a pairing: H=⟨G, K⟩ where K is some fixed point for which such a pairing is defined. This may be referred to as the Pairing enhancement (PEECH). Pairing evaluations are generally lower than scalar multiplications, so PEECH would be slower than LEECH. Generally, pairings evaluate into a field whose size is considerably larger than the field size used for the elliptic curve (or would be used for LEECH), so the hashes obtained from PEECH would be larger. Useful pairings are generally only defined for rather special types of curves (so, for example, a NIST curve cannot be used).

Checksum Enhancement of EECH (CHEECH)

A relatively fast, but not δ-incremental option for deriving H is to use a fast but non-cryptographic checksum. The checksum C=C(M) can be a simple XOR of the message blocks, or some more sophisticated error correcting code. The hash is computed as $H=G+E_k(m+1\|C(M))$. This enhancement may be referred to as the Checksum enhancement (CHEECH). In essence, CHEECH is EECH applied to the message (M, C(M)). Although CHEECH is not δ-incremental, it is still incremental because, if a small change is made to M, then H may be updated as quickly as the fast checksum can be recomputed. The reason that it is not δ-incremental is that it requires the full knowledge of M to make this update, which implies that the cost of the hash update depends on the length of M. For certain environments where incrementality is useful, it is realistic to assume that the entire message is available for recomputing the checksum. Generally, CHEECH will be faster than PEECH, provided the checksum and extra group addition can be computed faster than the pairing. Only for very long messages would C(M) start to cost more than a pairing. The hash size for CHEECH is smaller than PEECH. Finally, CHEECH can work over any elliptic curve or other secure group, no pairing required (so, for example, a NIST curve may be used).

The Ideal Cipher Model

In the Ideal Cipher model, it is assumed that $E_k$ is a random bijection from bit strings of a given length l to some random subset S of the group G. Furthermore, an adversary A can only compute $E_k$ through access to an oracle. The adversary may submit any bit string b of length l to the oracle and receive its encryption $E_k(b) \in G$.

In this embodiment, the adversary A may be allowed to compute $E_k^{-1}$ but again only by invoking an oracle. The adversary can submit any group element $G \in G$ to the oracle, and receive either its decryption $E_k^{-1}(G) \in \{0, 1\}^l$, or indication $\perp$ that $G \notin S$.

Such an oracle can be simulated for the adversary. The default simulation will now be described. A list $L=(L_1, \ldots, L_q)$ of pairs $L_i=(b_i, G_i)$ is maintained, where $b_i \in \{0,1\}^l \cup \{\perp\}$ and $G_i \in G$, which is initialized as empty, that is q=0.

Suppose now that the adversary A makes an $E_k$ query to the oracle with input $b \in \{0, 1\}^l$. First, b is checked to determine if $b=b_i$ for $1 \leq i \leq q$. If so, then a response is given comprising $G_i$. This is referred to as an old encryption query. If i is the least such index it can be said that the query has index i. If not, then increase the length of the list to q+1, and set $L_{q+1}=(b_{q+1}, G_{q+1})=(b, G_{q+1})$, where $G_{q+1} \in G \setminus \{G_1, \ldots, G_q\}$ is selected uniformly at random. The response is $G_{q+1}$. This may be referred to as a new encryption query, and it has index q+1.

Now, suppose A makes a $E_k^{-1}$ query to the oracle with input $G \in G$. It is first determined if $G=G_i$ for some $1 \leq i \leq q$. If so, a response with $b_i$ is given. This may be referred to as an old decryption query. If i is the least such index, it can be said that this query has index i. If not, then with probability $(2^l-p)/(|G|-q)$, where p is the number i such that $b_i \neq \perp$, a response with $b_{q+1}$ is made, which is chosen uniformly at random from $\{0, 1\}^l \setminus \{b_1, \ldots, b_q\}$. Otherwise a response with $b_{q+1}=\perp$ is made. The length of the list is incremented, defining $L_{q+1}=(b_{q+1}, G_{q+1})=(b_{q+1}, G)$. This may be called a new decryption query with index q+1, and it is valid if $b_{q+1} \neq \perp$, otherwise it is invalid.

More generally, for any interaction of an algorithm with an ideal cipher oracle, whether or not the default simulation above, old and new queries can be defined, similarly, as well indices of queries.

Collision Resistance

The proof for the collision resistance of MuHASH is first adapted to EECH, and its preimageresistant variants. In adapting the proof of MuHASH, decryption queries are note accounted for.

Theorem B.1:

Let $E_k$ be an ideal cipher. Let A be an algorithm that finds, with probability p, a collision in EECH using q encryption queries (but no decryption queries) to the ideal cipher oracle. A construction of an algorithm B is given (in the proof) that finds discrete logarithms in the group G. The probability of success for B is at least about $p-n_{-1}$. The cost of B is (excluding the cost of A) at most about 2Q scalar multiplications in the group G, where $Q \leq q+m+m'$, and m and m' are the block lengths of the encodings of the messages M and M' produced by A.

Proof:

Consider an instance (X, Y) of the discrete logarithm problem where the goal is to find z such that Y=zX. Algorithm B uses A to find z. Algorithm A expects to use an oracle $E_k$ for the ideal cipher. Algorithm B provides a simulation of such an oracle, as follows. To generate the new encryption query response $G_i$, algorithm B selects $x_i$ and $y_i$ uniformly at random and computes $G_i=x_iX+y_iY$, repeating as necessary to ensure that $G_i$ is distinct from previous group elements in its list. In all other respects, the simulated oracle acts as the default simulation does. Because $G_i$ has a uniform distribution, this simulation is actually indistinguishable from the default simulation. So, by its definition, with probability p, A finds a collision, which is to say, distinct messages M and M', giving rise to the same hash value H. Let m and m' denote the number of blocks in the encodings of M and M', respectively.

To verify the alleged collision pair M and M', algorithm B continues its simulation of the oracle to check that G=G'. This entails making at most m new encryption queries to find pre-hash G, and m' for G':

$$G = \sum_{j=1}^{m} E_k(j \| M_j),$$

$$G' = \sum_{j=1}^{m'} E_k(j \| M'_j).$$

Now, let Q the total number of new queries made. Then $Q \leq q+m+m'$. Algorithm B makes the encryption queries for M first, in ascending order of index j, and then queries for M', with j in ascending order.

Let i(j) be the index of encryption query $E_k(j \| N_j)$ and let i'(j) be the index of query $E_k(j \| M_j')$. Then we have $$G = \sum_{j=1}^{m} x_{i(j)} X + y_{i(j)} Y,$$

$$G' = \sum_{j=1}^{m'} x_{i(j)} X + y_{i(j)} Y.$$

For $1 \leq i \leq Q$, let j(i) be the number j such that i(j)=i. Define j'(i) similarly. Then:

$$G = \sum_{i=1}^{Q} j(i) x_i X + j(i) y_i Y,$$

and $$G' = \sum_{i=1}^{Q} j'(i) x_i X + j'(i) y_i Y.$$

If G=G', then computing G−G' and separating the X and Y contributions, it can be concluded that $$-\sum_{i=1}^{Q} (j(i) - j'(i)) x_i \equiv \left( \sum_{i=1}^{Q} j(i) - j'(i)) y_i \right) z \bmod n.$$

Here, n is the order of the group G, which is assumed to be prime. From this equation, z can be solved, unless the factor in front of z is zero (modulo n).

It can be asserted that algorithm A has no information about the $y_i$, and in particular, the $y_i$ are independent of j(i)–j'(i). Of course, algorithm B chose $y_i$ independently of earlier choices of A, but j(i)–j'(i) can depend on what A does after seeing $G_i = x_i X + y_i Y$. However, $G_i$ does not reveal anything about $y_i$ because for each possible value of $y_i$ there is a possible value of $x_i$. Given this assertion that the $y_i$ are independent of the j(i)–j'(i), the probability that $$\sum_{i=1}^{Q} (j(i) - j'(i)) y_i \equiv 0 \bmod n$$

is at most 1/n, provided that for at least one value of i, we have j(i)–j'(i)≠0 mod n. In this case B fails, and A has been extremely lucky.

Otherwise, j(i)≡j'(i) mod n for all i. Note that 0≤j(i),j'(i)≤1 because the counters j are increasing. Therefore we have j(i)=j'(i) for all i, which implies that M=M'. It may be noted that the proof above is really the conjunction of two proofs from work done by Bellare and Micciancio's work in developing MuHash: a first proof that MuHASH is secure in the random oracle model if the balance problem is hard, and a second proof that the balance problem is hard if the discrete logarithm problem is hard. The balance problem is: given a random set of group elements, find two distinct subsets whose sum is the same. In the same spirit we have:

Theorem B.2:

Function EECH is collision-resistant in the sense of Theorem B.1 if the balance problem for G is hard.

Proof:

The proof is similar to Theorem B.1 and the proof that MuHASH is secure under balance problem. Hardness of the balance problem is much closer to a necessary condition for the collision resistance of both EECH and MuHASH than the discrete logarithm is. If the balance problem is solvable in G, then in the ideal cipher model or random oracle model, the balance problem solver can be used to find a collision in EECH or MuHASH, respectively.

Hardness of the discrete logarithm problem, however, does not appear to be necessary for hardness of the balance problem, or for the collision resistance of MuHASH, as discussed in the publication of MuHash cited above nor does it appear necessary for EECH.

Collision Resistance with Decryption Queries

The possibility that the adversary makes decryption queries is now addressed, which, of course, is not unrealistic, since k is fixed and known. Consider the following collision finding algorithm A that uses just a single decryption query. Choose any message M, where m>3 and compute its EECH hash (pre-hash) G. Now A finds some colliding message M' as follows. Let $M_j' = M_j$ for j>3. Choose $M_1' \neq M_1$ at random and choose $M_2'$ by $j' \| M_2' = E_k^{-1}(E_k(1 \| M_1) + E_k(2 \| M_2) - E_k(1 \| M_1'))$ (27). If j'=2, then M' will form a collision with M. In the ideal cipher model, it can be assumed that j' is a random c-bit integer where c is some fixed value. The probability that j'=2 is then $2^{-c}$. The adversary can also repeat this process, trying on the about 2c random values of $M_1'$ to guarantee that one giving j'=2 will almost certainly be found. To prevent such an attack, we therefore need to choose c to make such an attack infeasible. Choosing c≈l/2, seems to be an effective way to do this, because 2c iterations will be too much for the adversary (if n≈2l). Incidentally, with c≈l/2, there is a good chance that there is no $M_1' \neq M_1$ that gives j'=2. In other words, any proof of collision resistance against an adversary who makes decryption queries depends on the plaintexts containing sufficient redundancy. Intuitively, the redundancy eliminates the any advantage the adversary gets from a decryption query. Of course, the redundancy requires dividing the message into more blocks, and thus requires more elliptic curve additions.

Theorem B.3:

Suppose that adversary A finds a collision in EECH, when implemented with an ideal cipher $E_k$. Suppose that EECH is implemented with c bits of redundancy per plaintext. Assume that A has probability p of succeeding, and that A makes q queries to the ideal cipher oracle. Then A can be used to build an algorithm B that solves the discrete logarithm problem in G. The probability of B succeeding is at most $p - n^{-1} - (1 - (1 - 2^{-c})^q)$, and the cost of B is about 2Q scalar multiplication in G, where Q≤q+m+m', where m and m' are the block lengths of the colliding messages found by A.

Proof:

The same construction can be used for B as in Theorem B.1. The event that every decryption query made by A yields an output that is invalid is first observed, in the sense that it cannot be used to form a plaintext block corresponding to a message. In this event, the decryption queries give A no advantage, so the proof of Theorem B.1 applies. Each decryption query has probability of $2^{-c}$ of being valid. The probability that at least one of q distinct decryption queries is valid is $1 - (1 - 2^{-c})^q$.

To apply this theorem, it may be noted that if q≈2c, then $(1 - 2^{-c})^q \approx e^{-1}$, where e is the base of the natural logarithm. Therefore if A has probability p of success significantly larger than $1 - e^{-1}$, then B will have significant probability of success. An attacker could try 2c encryption queries and 2c decryption queries of the form prescribed in (27). With probability about $1 - (1 - 2^{-c})^{2^c} \approx 1 - e^{-1}$, one of them of should yield a collision. Therefore, the bound in Theorem B.3 is close to optimal.

Collision Resistance of Processed EECH

It may now be shown that the various further processed implementations of EECH (prEECH) do not hinder the collision resistance of EECH.

Theorem B.4.

LEECH, REECH, PEECH, and CHEECH are each as collision resistant as EECH, in the sense that a collision in a prEECH leads to a collision in EECH.

Proof:

First, consider three arguments:

1. Functions LEECH and PEECH are the composition of an injection I with G (EECH). If (M,M') is a collision in LEECH or PEECH, meaning I(G(M))=I(G(M')), then G(M)=G(M'), because I is injective. Therefore (M,M') is a collision in EECH.

2. Function REECH can be considered EECH applied twice. If (M,M') is a collision in REECH, meaning G(G(M))=G(G(M')), then (M, M') or (G(M),G(M')) is a collision in EECH.

3. Function CHEECH can be considered EECH applied to the message with a checksum added. If (M,M') is a collision in CHEECH, meaning G(M,C(M))=G(M',C(M')), then (M,C(M)) and (M', C(M')) provides a collision in EECH. In all three cases, we have an immediate deduction to a collision in EECH.

Preimage Resistance

There is an argument that states that a collision resistant hash function is also preimage resistant: If not, just pick some random message, compute its hash, and then find a preimage, which gives a collision with the original message. This argument is contingent, however, on some implicit assumptions about the hash function. For example, the argument fails if the hash is only preimage resistant on the hashes of random messages, but has a pathological range of hash values for which a single preimage is easy to find. The Handbook of Applied Cryptography, Note 9.20, gives an example of such a hash.

One could argue, though, that most hash function designs would not be so pathological, and therefore that the grounds above for insisting on preimage resistance (over and above collision resistance) are only theoretical. The case of EECH, it is a non-pathological example of hash that may be collision resistant but is not preimage resistant. Recall that if an adversary knows all of a message except for a single block, then the adversary can use G to find the missing block. In particular, if the message has only a single block, then an adversary can use G to find the whole message, provided that G is actually the pre-hash of a single block message, which actually only true for a negligible proportion of random $G \in G$. Single block inversion cannot be converted into a collision attack using the argument above, because, when varying only a single message block, EECH is injective, and therefore collision-free (not just collision-resistant).

The fact that EECH is the foundation for LEECH, REECH, PEECH and CHEECH—despite EECH lacking comprehensive preimage resistance—constitutes more than a theoretical ground for insisting on preimage resistance. Accordingly, the preimage resistance of LEECH, REECH, PEECH and CHEECH can be proven. A form of partial preimage resistance for EECH, where the part of message unknown to the adversary is distributed over two or more message blocks can also be proven.

Bijective Enhancements

The enhancements LEECH and PEECH are first addressed which, as discussed above, are obtained by applying a one-way bijection to EECH.

Theorem C.1.

Suppose that algorithm A finds preimages of LEECH for random elements in its range with probability p. Then we can construct an algorithm B (construction given in the proof), using A as a subroutine, such that B solves discrete logarithms to be the base P (the same based used in LEECH) with total probability p.

Proof:

Algorithm B is given random group element Q and needs to find u such that Q=uP. Algorithm A call algorithm A on input Q, which finds, with probability p a message M such that H(M)=Q. Algorithm sets u=[G(M)] where G(M) is the EECH pre-hash of M.

Theorem C.2.

Suppose that algorithm A finds preimages of PEECH for random elements in its range with probability p. Then we can construct an algorithm B (construction given in the proof), using A as a subroutine, such that B inverts the pairing function $\langle, K \rangle$ with total probability p.

Proof:

Algorithm B is given V and needs to solve for U such that $V=\langle U, K \rangle$. Algorithm B calls algorithm A on input H=V, using the default simulation of the encryption oracle. When A outputs an alleged preimage M, algorithm B continues running the encryption oracle to compute the pre-hash G. Finally, B outputs U=G. It may be noted that if the pairing is a symmetric pairing on the group G, then inverting the pairing is as difficult as the (computational) Diffie-Hellman problem, since, if we put $V=\langle xK \bullet, yK \rangle$, then we have U=xyK, in the notation of the proof above.

Partial Preimage Resistance of EECH Itself

While EECH does not have full preimage resistance, it can nevertheless be shown that EECH does have a partial form of preimage resistance. First, some lemmas.

Lemma C.1.

Suppose that a function H: X→Y has the property that for random $x \in X$, then $\#H^{-1}(H(x)) \geq 2$, with probability q. Let A be an algorithm such that for random $x \in X$, given H(x) algorithm A finds x' such that H(x')=H(x) with probability p. Suppose that the cost of A is t. Then an algorithm B can be built using A that finds a collision (x, x') in H, meaning x≠x' but H(x)=H(x'), with probability at least (p+q−1)/2 and cost t+∈, where ∈ is the cost of sampling $x \in X$ plus computing H.

Proof:

Algorithm B works as follows. First, it selects random $x \in X$. Second, it computes h=H(x). Third, it calls A on input h, which outputs x'. Finally, B outputs (x, x'). By definition of A, with probability p we have H(x')=h. It is assumed in this event. By the assumption on H, with probability at most 1−q, we have $\#H^{-1}(h)=1$. If this event is excluded, then we get a probability of at least p+q−1, for the event that H(x')=h and $\#H^{-1}(h)>2$. In this event, the probability that x=x' is at most ½. Therefore with probability at least (p+q−1)/2, the desired collision can be found. In essence, this simple lemma is the basic argument above, with a non-degeneracy criterion for the hash function. (A form of this argument has been described by Stinson.)

Lemma C.2:

With the same assumptions as Lemma C.1, suppose that #X=r#Y, then $q \geq 1-r^{-1}$.

Proof:

At most #Y elements x of X are such that $\#H^{-1}(x)=1$. It is now supposed that in EECH the number of values of each message block is about $\sqrt{n}$, so that half the plaintext bits are used for the message, the other half for the index and counters.

Theorem C.3:

Let A be an algorithm that does the following. Algorithm A is given G(M) where at least three message blocks have been selected uniformly at random. Algorithm A then finds message M' such that G(M')=G(M), with probability p and cost t. Then A can be used to construct an algorithm B that finds a collision in G with probability p'≈p/2 and cost t'≈t.

Proof:

Suppose that blocks $M_i$, $M_j$, $M_l$ are selected at random. Let X be the space of all such triples $(M_i, M_j, M_l)$. Let Y=G. Fixing all other message blocks, EECH defines a function H: X→Y, as in Lemma C.2 with r≈$\sqrt{n}$. Applying Lemma C.1, we have p'≈(p+1−1/$\sqrt{n}$−1)/2≈p/2. If more than three blocks are randomized, the result can be applied for above for each fixed value of the other randomized blocks, or just use a larger value of r. Of course, it should be noted that one generally expects a higher security level against preimage attacks than against collision attacks. This result does not provide such an increase in security level.

If only two blocks are randomized, then such a simple counting argument may not hold, because we get r≈1. If more the plaintext blocks are devoted to the message, then we do get r>1, but then we risk an easier collision attack. Instead, we can use the ideal cipher model.

Theorem 5.4:

Let A be an algorithm that does the following. It is given G(M) where exactly two blocks of M have been selected uniformly at random. Suppose A finds a message M' such that G(M')=G(M) with probability p and cost t, where G is EECH instantiated in the ideal cipher model. Then A be used to devise an algorithm B that finds a collision in EECH with a probability and cost which needs to be determined.

Proof.

Algorithm B provides a simulation of the ideal cipher oracle for A, which is then continued to verify that $G(M)=G(M')$. Of course $(M', M)$ is a collision, unless $M'=M$. Let i and j be indices of the message blocks of M chosen at random. We need to show that $G(M)$ reveals nothing $(M_i, M_j)$ and therefore that A has negligible probability of producing $M'=M$: $G(M)=E_k(i||M_i)+E_k(j||M_j)+H$, (28) where H is evaluated over a fixed remainder of the message. The algorithm chooses a random point $G \in G$ and gives this to A as the value of $G(M)$. For the simulation of the ideal cipher oracle, algorithm B uses the default simulation with exception of the second of new encryption queries $(i||M_i)$ and $(j||M_j)$. Suppose that the first response to one of this is a random $R \in G$. The second response is $G-R-H$.

If A does not make encryption queries to at least one of $(i||M_i)$ and $(j||M_j)$, or a decryption query to R or $G-R-H$, then $M_i$ and $M_j$ can take any value, they can be decided by B after A is done, during the verification of $G(M')=G(M)$. On the other hand A has negligible chance of guessing one of the four fixed values above.

Corollary C.1.

Let A be an algorithm that on input of a uniformly random $G \in G$, finds an EECH pre-image of G, when instantiated in the ideal cipher model. That is, a message M such that $G(M)=G$. Then A can be used to construct an algorithm B that finds a collision in EECH.

Proof:

The hashes of single block messages form a negligible small portion of G, so for random $G \in G$, any preimage M has with overwhelming probability at least two blocks. Now the previous result may be applied.

Non-Bijective Enhancements of EECH

Corollary 5.2: CHEECH is preimage resistant, even if only a single block in unknown to the adversary.

Proof:

Suppose that an adversary A can find preimages in CHEECH, with only one unknown single block. Then (M, C(M)) has two blocks that are unknown to the adversary, by the properties of C(M) (such as being the sum of the all blocks in some efficiently computable group). In essence, the CHEECH of M is the EECH of (M, C(M)). Inverting CHEECH on M with one secret block, is essentially inverting EECH on (M, C(M)) with two secret blocks and extra condition that the checksum be consistent. But we already saw that inverting EECH with two secret blocks is infeasible.

Theorem 5.5:

REECH is preimage resistant.

Proof:

Suppose that an adversary A finds a REECH preimage M of random $H \in G$. Then $G(M)$ is a two-block EECH preimage of random $H \in G$, which is infeasible.

Security of Cipherless Variants in the Generic Group Mode

The ideal cipher model enables the security proof to be found, but, as noted above it is an objective that the security should not require the block cipher to be secure.

Conjecture D.1.

If the block cipher in EECH is replaced by the identity function, the result is collision resistant. With the same replacement, the prEECH functions remain collision and preimage resistant. EECH with $E_k$ instantiated by the identity function is equivalent to an implementation of the Elliptic Curve Only Hash, namely ECOH described in detail above.

To illustrate the overlap, we define Logarithmic, Repeated, Pairing and Checksum ECOH, analogously. The proofs that depend on the ideal cipher model proofs are not necessarily applicable to ECOH and prECOH, because the identity function seems quite inappropriate to model as a random. Some of the proofs do not use the ideal cipher model, so these still apply. In particular, Theorems B.4 and C.1 still apply.

Another non-standard model, the generic group model can be used to prove the collision resistance of ECOH. This should not be too surprising, given a generic group has randomized representations, which is not unlike encrypting the representation.

Theorem D.1.

In the generic group model, EECH is collision resistant, provided that $E_k$ is bijective. In particular, ECOH is collision resistant in the generic group model.

Proof:

Suppose that algorithm A finds a collision in EECH when the group is implemented as a generic group. Suppose that M and M' are the colliding messages that A finds. Provided that A does not make too many queries, then the none of the outputs of the generic group oracle (where the input queries consist of previous outputs of the generic group oracle) will have a representation consistent with the embedding of message blocks into the group.

A realistic version of the generic group model for EECH allows the oracle to accept arbitrary bit string representations of group elements, and these should have reasonable chance of being valid (or else ECOH would not be feasible). To verify the collision of M and M', one invokes the generic group oracle. One finds that all of the message blocks, represented as group elements, are new inputs, and thus are assigned random discrete logarithms by the generic group oracle. The sums of two sets of random numbers have negligible chance of being equal.

TEECH

Each of the functions above has outputs in some cryptographic group. As such, the hash value may have properties making it distinguishable from a random bit string. A hash function derived from EECH is now provided whose output appears more random: $H-T_t(E_k(G))$ where T is a function that truncates t bits from a bit string. This enhancement may be referred to as Truncated EECH (TEECH). The greater is t, the better the pseudorandomness, but the larger the group G that is used, which makes its computation slower than the others. Another possible disadvantage is that TEECH is not incremental, unless we keep a copy of the pre-hash G together with the message (as we proposed to do for LEECH and REECH).

Function TEECH, is a little different in design from the LEECH, PEECH, REECH and CHEECH, because there may be significant information loss after the EECH. If t is set too high, then one can find collisions in TEECH by the birthday paradox, and preimages are also easier to find. So, TEECH fails to meet our second tenet of minimalism: there is no direct translation from a collision in TEECH to a collision EECH. However, in the ideal cipher model, we can formulate such a translation.

Theorem A.:

Provided that t is not too low, and algorithm A finds a collision in TEECH by working in the ideal cipher model (only respect to the conversion of EECH to TEECH), then an algorithm B may be constructed that finds a collision in EECH.

Proof:

Algorithm B will simulate for A an ideal cipher oracle as follows. For encryption oracle query with input $G \in G$, algorithm B outputs a random bit string of length l (the block size of the cipher). For decryption oracle query with input $b \in \{0, 1\}^l$, output a random $G \in G$. This is essentially the default simulation mentioned earlier, but note that in the opposite direction to the one used for EECH because EECH uses the cipher in the opposite direction to TEECH (bit strings to group elements). By its definition, A will find a collision, say (M, M').

Algorithm B now verifies the collision $T_t(E_k(G(M)))=T_t(E_k(G(M')))$, where G is the function EECH. The verification is done by continuing its simulation of the ideal cipher oracle. If:

1. G(M) and G(M') both first appeared in the oracle interactions as inputs to new encryption queries (either made by A or by B in the verification of the collision)l;
2. G(M)≠G(M'), and
3. t is not too small;

then the probability that of being a collision is negligible, because here B will select $E_k(M)$ and $E_k(M_0)$ as random bit strings of length l, making the their probability of colliding $2^{l-t}$. If G(M)=G(M'), we have found our collision in EECH, and by the hypothesis t is not too small.

The only remaining case is that at least one of G(M) or G(M') did not first appear as a new input query, say G(M). Then G(M) first appears as the output of a decryption query, with input say b. Now G=G(M) was selected as a random point, and algorithm A somehow found an EECH preimage M to G. In other words, the only remaining case is that A can actually invert EECH on random values in G. We will prove later that this is infeasible.

Another important goal of TEECH is preimage resistance. To prove this, we may again be able to resort to the ideal cipher model. We note that from our minimalist perspective, TEECH is preferable to the function $G+E_k(G)$, where G is EECH, because by making the block cipher an identity function, TEECH appears to be preimage resistant, whereas $G+E_k(G)=2G$ is definitely not.

Although the above has been described with reference to certain specific embodiments, various modifications thereof will be apparent to those skilled in the art without departing from the scope outlined in the claims appended hereto.

The invention claimed is:

1. A computer-implemented method for generating a cryptographic hash H of a message M, said method comprising:
   a cryptographic unit obtaining said message M;
   said cryptographic unit dividing said message M into a plurality of blocks;
   said cryptographic unit indexing each block by adding a unique index value to each block;
   said cryptographic unit mapping each block into a group using an identity function instead of an available hash function to provide a plurality of points on an elliptic curve; and
   said cryptographic unit computing a total point by summing said plurality of points on said elliptic curve and deriving said hash H of said message M from said total point by applying a one-way function to said total point.

2. The method according to claim 1, further comprising said cryptographic unit padding said message M prior to said dividing.

3. The method according to claim 2, wherein said indexing comprises adding a bit representation of an index to each block, said index being incremented for each block to obtain said respective unique index value.

4. The method according to claim 2, wherein each group element is generated by: said cryptographic unit generating a valid x-coordinate for a respective indexed block by searching a series of candidate values and incrementing a counter until said valid x-coordinate is found, and said cryptographic unit generating a respective point on said elliptic curve using said valid x-coordinate.

5. The method according to claim 1, wherein said hash H is derived from said total point according to the following equation: $\lfloor x(Q+\lfloor x(Q)/2 \rfloor G)/2 \rfloor \mod 2^n$, where Q is said total point, G is a generator point, and n is a length of said hash H in bits.

6. The method according to claim 1, wherein said plurality of group elements are computed using a block cipher applied to each indexed block.

7. The method according to claim 6 wherein said block cipher uses a non-secret key k.

8. The method according to claim 7 wherein said plurality of group elements are summed by said cryptographic unit to generate a prehash, said prehash being said output and enabling further processing to generate said hash H therefrom.

9. The method according to claim 8, further comprising:
   said cryptographic unit obtaining an updated message M' comprising at least one modified block; and
   for each said at least one modified block:
      said cryptographic unit applying said block cipher to said modified block;
      said cryptographic unit determining a difference imparted by said modified block; and
      said cryptographic unit applying said difference to said prehash to generate an updated prehash.

10. The method according to claim 1, wherein said obtaining comprises said cryptographic unit receiving said message M and a digital signature on said message M, and said method further comprises using said hash H in verifying said digital signature.

11. The method according to claim 10, wherein said cryptographic unit resides in a mobile communications device.

12. A non-transitory computer readable medium comprising computer executable instructions for generating a cryptographic hash H of a message M, said computer readable medium comprising instructions for:
   obtaining said message M;
   dividing said message M into a plurality of blocks;
   indexing each block by adding a unique index value to each block;
   mapping each block into a group using an identity function instead of an available hash function to provide a plurality of points on an elliptic curve; and
   computing a total point by summing said plurality of points on said elliptic curve and deriving said hash H of said message M from said total point by applying a one-way function to said total point.

13. The non-transitory computer readable medium according to claim 12, further comprising instructions for padding said message M prior to said dividing.

14. The non-transitory computer readable medium according to claim 13, wherein said indexing comprises adding a bit representation of an index to each block, said index being incremented for each block to obtain said respective unique index value.

15. The non-transitory computer readable medium according to claim 13, wherein each group element is generated using instructions for: generating a valid x-coordinate for a respective indexed block by searching a series of candidate values and incrementing a counter until said valid x-coordinate is found, and generating a respective point on said elliptic curve using said valid x-coordinate.

16. The non-transitory computer readable medium according to claim 12, wherein said hash H is derived from said total point according to the following equation: $\lfloor x(Q+\lfloor x(Q)/2 \rfloor G)/$ 2⌋ mod $2^n$, where Q is said total point, G is a generator point, and n is a length of said hash H in bits.

17. The non-transitory computer readable medium according to claim 12, wherein said plurality of group elements are computed using a block cipher applied to each indexed block.

18. The non-transitory computer readable medium according to claim 17 wherein said block cipher uses a non-secret key k.

19. The non-transitory computer readable medium according to claim 18 wherein said plurality of group elements are summed to generate a prehash, said prehash being said output and enabling further processing to generate said hash H therefrom.

20. The non-transitory computer readable medium according to claim 19, further comprising instructions for:
   obtaining an updated message M' comprising at least one modified block; and
   for each said at least one modified block:
      applying said block cipher to said modified block;
      determining a difference imparted by said modified block; and
      applying said difference to said prehash to generate an updated prehash.

21. The non-transitory computer readable medium according to claim 12, wherein said obtaining comprises receiving said message M and a digital signature on said message M, and further comprising instructions for using said hash H in verifying said digital signature.

22. The non-transitory computer readable medium according to claim 21, wherein said computer readable medium resides in a mobile communication device and is accessible to a cryptographic unit in said mobile communications device.

23. A computing device comprising a processor for generating a cryptographic hash H of a message M, said computing device being configured for:
   obtaining said message M;
   dividing said message M into a plurality of blocks;
   indexing each block by adding a unique index value to each block;
   mapping each block into a group using an identity function instead of an available hash function to provide a plurality of points on an elliptic curve; and
   computing a total point by summing said plurality of points on said elliptic curve and deriving said hash H of said message M from said total point by applying a one-way function to said total point.

24. The computing device according to claim 23, further configured for padding said message M prior to said dividing.

25. The computing device according to claim 24, wherein said indexing comprises adding a bit representation of an index to each block, said index being incremented for each block to obtain said respective unique index value.

26. The computing device according to claim 24, wherein each group element is generated by: said cryptographic unit generating a valid x-coordinate for a respective indexed block by searching a series of candidate values and incrementing a counter until said valid x-coordinate is found, and said cryptographic unit generating a respective point on said elliptic curve using said valid x-coordinate.

27. The computing device according to claim 23, wherein said hash H is derived from said total point according to the following equation: $\lfloor x(Q+\lfloor x(Q)/2 \rfloor G)/2 \rfloor$ mod $2^n$, where Q is said total point, G is a generator point, and n is a length of said hash H in bits.

28. The computing device according to claim 23, wherein said plurality of group elements are computed using a block cipher applied to each indexed block.

29. The computing device according to claim 23 wherein said block cipher uses a non-secret key k.

30. The computing device according to claim 29 wherein said plurality of group elements are summed by said cryptographic unit to generate a prehash, said prehash being said output and enabling further processing to generate said hash H therefrom.

31. The computing device according to claim 30, further configured for:
   obtaining an updated message M' comprising at least one modified block; and
   for each said at least one modified block:
      applying said block cipher to said modified block;
      determining a difference imparted by said modified block; and
      applying said difference to said prehash to generate an updated prehash.

32. The computing device according to claim 23, wherein said obtaining comprises said cryptographic unit receiving said message M and a digital signature on said message M, and said computing device further comprises using said hash H in verifying said digital signature.

33. The computing device according to claim 32, wherein said cryptographic unit resides in a mobile communications device.

* * * * *

UNITED STATES PATENT AND TRADEMARK OFFICE
CERTIFICATE OF CORRECTION

| | |
|---|---|
| PATENT NO. | : 8,891,756 B2 |
| APPLICATION NO. | : 12/609891 |
| DATED | : November 18, 2014 |
| INVENTOR(S) | : Daniel Richard L. Brown et al. |

It is certified that error appears in the above-identified patent and that said Letters Patent is hereby corrected as shown below:

In the Claims,

In Column 46, Line 21, In Claim 29, delete "23" and insert -- 28 --, therefor.

Signed and Sealed this
Tenth Day of March, 2015

Michelle K. Lee
*Deputy Director of the United States Patent and Trademark Office*